United States Patent
Cooley et al.

(10) Patent No.: US 9,562,561 B2
(45) Date of Patent: Feb. 7, 2017

(54) BEARING ELEMENTS, BEARING APPARATUSES INCLUDING SAME, AND RELATED METHODS

(71) Applicant: US Synthetic Corporation, Orem, UT (US)

(72) Inventors: Craig H. Cooley, Saratoga Springs, UT (US); Timothy N. Sexton, Santaquin, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 14/212,366

(22) Filed: Mar. 14, 2014

(65) Prior Publication Data

US 2014/0341487 A1    Nov. 20, 2014

Related U.S. Application Data

(63) Continuation of application No. 13/540,059, filed on Jul. 2, 2012, now Pat. No. 8,708,564, which is a
(Continued)

(51) Int. Cl.
*F16C 17/02* (2006.01)
*F16C 33/04* (2006.01)
(Continued)

(52) U.S. Cl.
CPC .............. *F16C 17/02* (2013.01); *E21B 4/003* (2013.01); *F16C 17/04* (2013.01); *F16C 17/06* (2013.01);
(Continued)

(58) Field of Classification Search
CPC ......... F16C 17/02; F16C 17/03; F16C 17/035; F16C 17/04; F16C 17/06; F16C 17/10; F16C 33/04; F16C 33/043; F16C 33/26; F16C 2352/00; F16C 2206/04; E21B 4/003
(Continued)

(56) References Cited

U.S. PATENT DOCUMENTS

| | | | |
|---|---|---|---|
| 3,132,908 A | 5/1964 | Grotzinger | |
| 3,311,431 A | 3/1967 | Hilliard | |

(Continued)

FOREIGN PATENT DOCUMENTS

| | | |
|---|---|---|
| DE | 4226986 | 2/1994 |
| EP | 0543461 | 5/1993 |

(Continued)

OTHER PUBLICATIONS

International Search Report from PCT/US2006/033201; Dec. 19, 2006.
(Continued)

*Primary Examiner* — Alan B Waits
(74) *Attorney, Agent, or Firm* — Holland & Hart LLP

(57) ABSTRACT

Bearing apparatuses including contacting bearing surfaces comprising superhard materials are disclosed. In one embodiment, the present invention relates to bearings including polycrystalline diamond inserts or compacts defining a plurality of surfaces that move relative to one another and contact one another. For example, apparatuses may include radial bearings, or other bearings including arcuate bearing surfaces that more in relation to one another, without limitation. In one embodiment, a superhard bearing element may comprise a superhard table (e.g., polycrystalline diamond) forming an arcuate bearing surface. Further, such a superhard bearing element may comprise a chamfer formed about at least a portion of a periphery of the arcuate bearing surface. Bearing apparatuses including such bearing elements and various mechanical systems are disclosed.

14 Claims, 24 Drawing Sheets

Related U.S. Application Data continuation of application No. 11/465,010, filed on Aug. 16, 2006, now Pat. No. 8,210,747, which is a continuation-in-part of application No. 11/212,232, filed on Aug. 26, 2005, now Pat. No. 7,703,982.

(51) Int. Cl.
| | |
|---|---|
| *F16C 33/26* | (2006.01) |
| *E21B 4/00* | (2006.01) |
| *F16C 17/04* | (2006.01) |
| *F16C 17/06* | (2006.01) |
| *F16C 33/10* | (2006.01) |

(52) U.S. Cl.
CPC .............. *F16C 33/04* (2013.01); *F16C 33/043* (2013.01); *F16C 33/108* (2013.01); *F16C 33/26* (2013.01); *F16C 2206/04* (2013.01); *F16C 2352/00* (2013.01)

(58) Field of Classification Search
USPC ........................................ 384/129, 284, 285
See application file for complete search history.

(56) References Cited

U.S. PATENT DOCUMENTS

| | | | |
|---|---|---|---|
| 3,371,970 A | 3/1968 | Beerli | |
| 3,542,441 A | 11/1970 | Nixon | |
| 3,625,327 A | 12/1971 | Birdsey | |
| 3,745,623 A | 7/1973 | Wentorf, Jr. et al. | |
| 3,858,668 A | 1/1975 | Bell | |
| 3,858,669 A | 1/1975 | Jeter | |
| 4,129,343 A | 12/1978 | Janssen | |
| 4,226,485 A | 10/1980 | Pruvot | |
| 4,240,683 A | 12/1980 | Crase | |
| 4,256,190 A | 3/1981 | Bodine | |
| 4,268,094 A | 5/1981 | Greene | |
| 4,345,798 A | 8/1982 | Cortes | |
| 4,386,666 A | 6/1983 | Crase et al. | |
| 4,410,054 A | 10/1983 | Nagel et al. | |
| 4,468,138 A | 8/1984 | Nagel | |
| 4,506,998 A | 3/1985 | Showalter | |
| 4,515,486 A | 5/1985 | Ide | |
| 4,560,014 A | 12/1985 | Geczy | |
| 4,604,106 A | 8/1986 | Hall | |
| 4,620,601 A | 11/1986 | Nagel | |
| 4,629,373 A | 12/1986 | Hall | |
| 4,639,146 A | 1/1987 | Yoshioka et al. | |
| 4,657,090 A | 4/1987 | Geczy | |
| 4,662,348 A | 5/1987 | Hall et al. | |
| 4,708,496 A | 11/1987 | McPherson | |
| 4,710,036 A | 12/1987 | Geczy | |
| 4,720,199 A | 1/1988 | Geczy et al. | |
| 4,729,440 A | 3/1988 | Hall | |
| 4,732,364 A | 3/1988 | Seger et al. | |
| 4,738,322 A | 4/1988 | Hall et al. | |
| 4,756,631 A | 7/1988 | Jones | |
| 4,764,036 A | 8/1988 | McPherson | |
| 4,802,539 A | 2/1989 | Hall et al. | |
| 4,818,124 A | 4/1989 | Brandenstein et al. | |
| 4,997,292 A | 3/1991 | Klimkovsky et al. | |
| 5,092,687 A * | 3/1992 | Hall .............................. | 384/303 |
| 5,125,754 A | 6/1992 | Ide | |
| 5,253,939 A | 10/1993 | Hall | |
| 5,364,192 A | 11/1994 | Damm et al. | |
| 5,368,398 A | 11/1994 | Damm et al. | |
| 5,441,347 A | 8/1995 | Ide | |
| 5,480,233 A * | 1/1996 | Cunningham ................ | 384/308 |
| 5,498,081 A | 3/1996 | Dennis et al. | |
| 5,735,668 A | 4/1998 | Klein | |
| 5,743,654 A | 4/1998 | Ide et al. | |
| 5,795,077 A | 8/1998 | Gozdawa | |
| 5,876,125 A | 3/1999 | Wyndorps et al. | |
| 6,000,851 A | 12/1999 | Cohen et al. | |
| 6,091,175 A | 7/2000 | Kinsinger | |
| 6,422,754 B1 | 7/2002 | Dong et al. | |
| 6,424,066 B1 | 7/2002 | Watson et al. | |
| 6,488,103 B1 | 12/2002 | Dennis et al. | |
| 6,517,246 B2 | 2/2003 | Blackley | |
| 6,793,681 B1 | 9/2004 | Pope et al. | |
| 7,060,641 B2 | 6/2006 | Qian et al. | |
| 7,163,368 B2 | 1/2007 | Ide et al. | |
| 7,306,059 B2 * | 12/2007 | Ide ................................ | 175/107 |
| 7,608,333 B2 | 10/2009 | Eyre | |
| 7,703,982 B2 | 4/2010 | Cooley | |
| 7,726,420 B2 | 6/2010 | Shen et al. | |
| 7,798,257 B2 | 9/2010 | Shen et al. | |
| 7,870,913 B1 | 1/2011 | Sexton et al. | |
| 8,277,124 B2 | 10/2012 | Sexton et al. | |
| 8,616,304 B2 | 12/2013 | Scott et al. | |
| 2004/0241021 A1 | 12/2004 | Ide et al. | |
| 2005/0247492 A1 | 11/2005 | Shen et al. | |
| 2006/0278439 A1 | 12/2006 | Ide | |
| 2007/0046120 A1 | 3/2007 | Cooley et al. | |
| 2007/0110561 A1 | 5/2007 | Ide et al. | |
| 2008/0115976 A1 | 5/2008 | Ide | |
| 2011/0067929 A1 | 3/2011 | Mukhopadhyay et al. | |
| 2011/0174544 A1 | 7/2011 | Scott et al. | |
| 2011/0174547 A1 | 7/2011 | Sexton et al. | |

FOREIGN PATENT DOCUMENTS

| | | |
|---|---|---|
| GB | 2057069 | 3/1981 |
| WO | 80/01939 | 9/1980 |

OTHER PUBLICATIONS

Non-Final Office Action received in U.S. Appl. No. 11/879,867; Dec. 1, 2009.
Final Office Action received in U.S. Appl. No. 11/879,867; May 18, 2010.
Restriction Requirement received in U.S. Appl. No. 11/879,867; Aug. 27, 2009.
Issue Notification received in U.S. Appl. No. 11/879,867; Dec. 28, 2010.
Notice of Allowance received in U.S. Appl. No. 11/879,867; Nov. 26, 2010.
Notice of Allowance received in U.S. Appl. No. 11/879,867; Sep. 2, 2010.
Office Action received in U.S Appl. No. 12/964,208; Apr. 4, 2011.
Notice of Allowance received in U.S. Appl. No. 12/964,208; Aug. 23, 2011.
Office Action received in U.S. Appl. No. 13/793,653; May 16, 2013.
English Abstract and Machine translation of DE 4226986. Feb. 17, 1994.

* cited by examiner

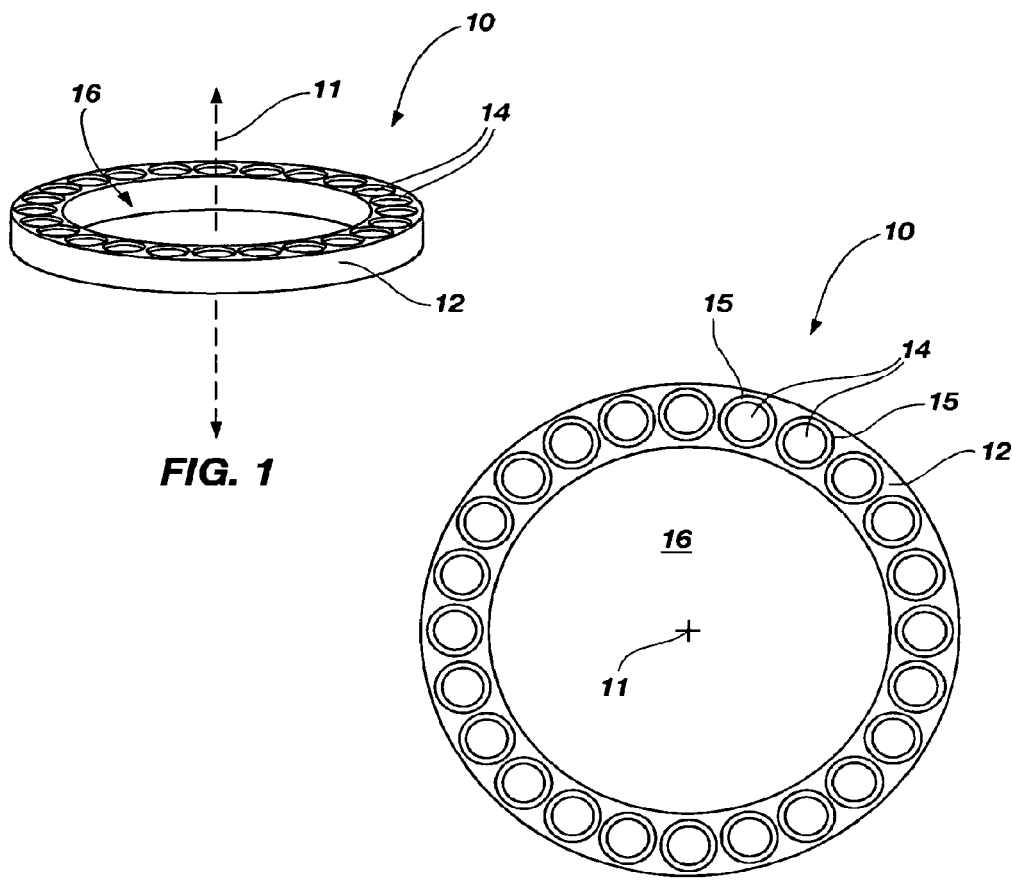
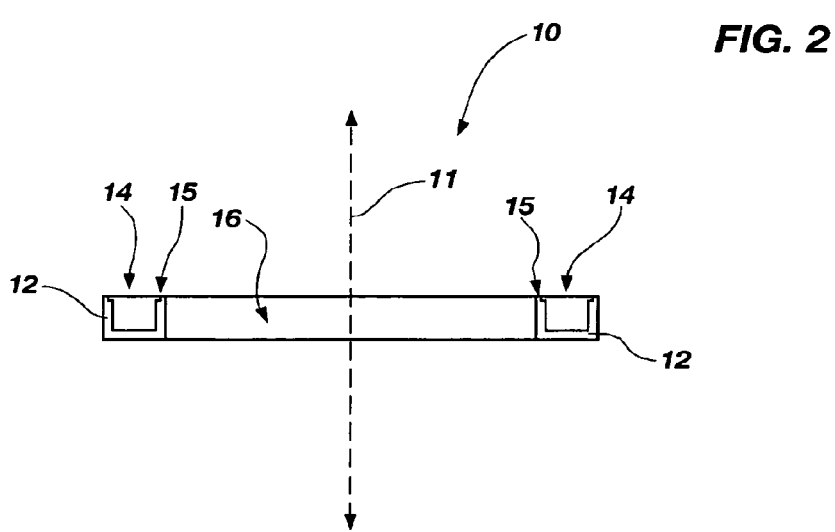
FIG. 1
FIG. 2
FIG. 3

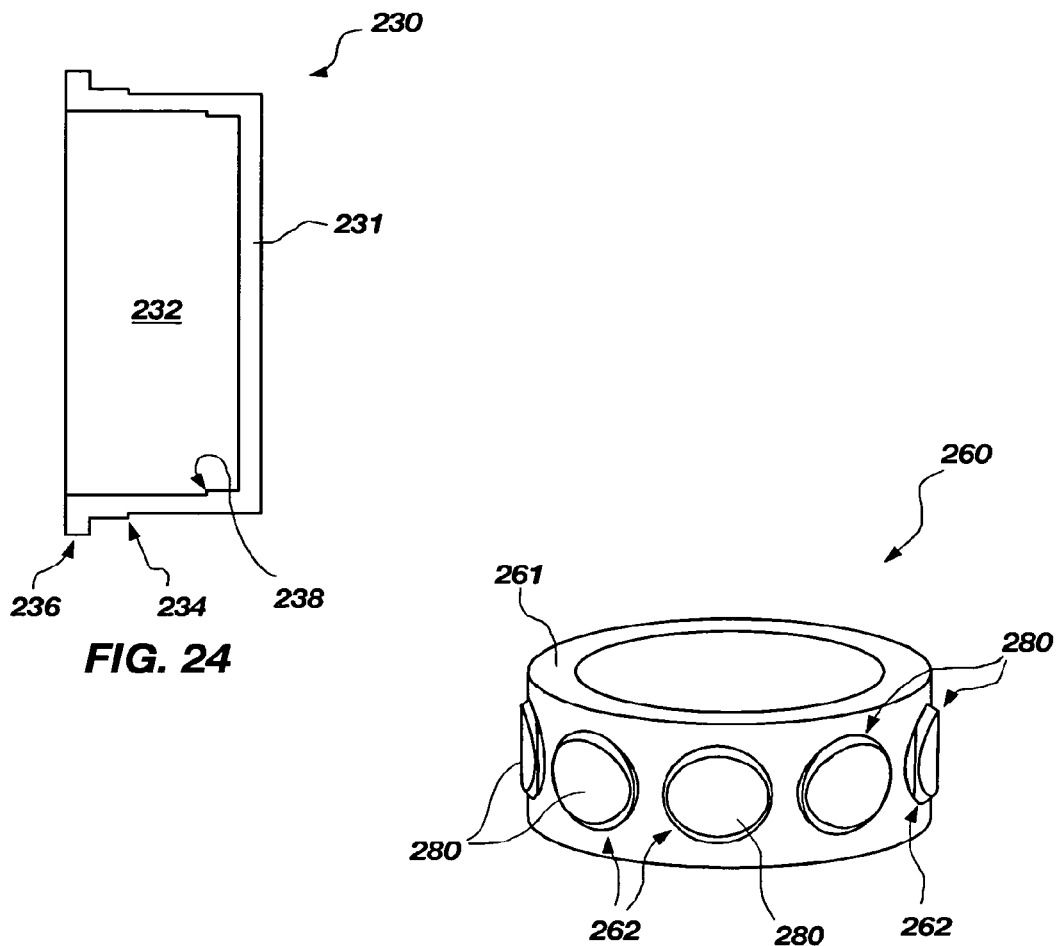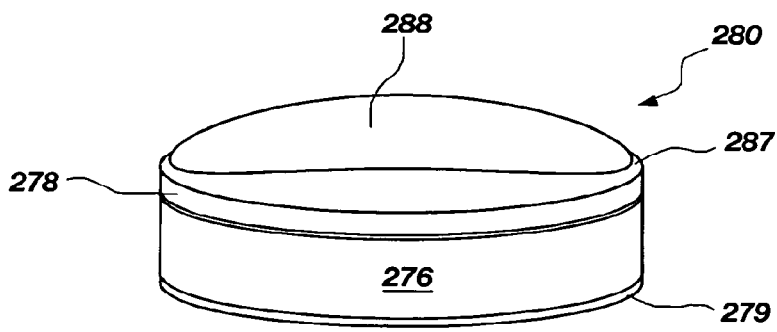

BEARING ELEMENTS, BEARING APPARATUSES INCLUDING SAME, AND RELATED METHODS

CROSS-REFERENCE TO RELATED APPLICATION

This application is a continuation of U.S. patent application Ser. No. 13/540,059, filed Jul. 2, 2012, which is a continuation of U.S. patent application Ser. No. 11/465,010 filed Aug. 16, 2006, now U.S. Pat. No. 8,210,747, which is a continuation-in-part of U.S. patent application Ser. No. 11/212,232, filed Aug. 26, 2005, now U.S. Pat. No. 7,703,982, the disclosures of each which are incorporated, in their entireties, by this reference.

BACKGROUND

Conventional bearing apparatuses including bearing surfaces that move relative to one another are known in the art. For example, conventional, so-called "thrust bearings" and some embodiments of radial bearings include bearing surfaces that at least partially contact and move or slide relative to one another. Such bearing surfaces may include a superhard material for resisting wear during use of the bearing. In one example, diamond (e.g., polycrystalline diamond) may comprise at least one or both of the bearing surfaces.

More particularly, one application for bearings is drilling equipment utilized in the subterranean drilling arts. Particularly, drilling motors and drill bits with moving members, such as roller cones have been utilized for drilling boreholes into a subterranean formation, especially for oil or gas exploration. In a typical downhole drilling motor, the motor is suspended at the lower end of a string of drill pipe comprising a series of pipe sections connected together at joints and supported from the surface. A rotary drill bit (e.g., a fixed cutter drill bit, roller cone drill bit, a reamer, etc.) may be supported below the drilling motor (via pipe sections, drill collars, or other structural members as known in the art) or may be directly connected to the downhole motor, if desired. Drilling fluid, which is commonly known as drilling mud, is circulated through the pipe string and the motor to generate torque within the motor for causing the rotary drill bit to rotate. Then, the drilling fluid is returned to the surface through the annular space between the drilled borehole and the drill string and may carry the cuttings of the subterranean formation to the surface.

Further, as known in the art, mechanical systems may include radial bearings. For example, conventional downhole drilling may employ radial bearings. In one embodiment, an inner and outer race are each provided with a plurality of superhard bearing elements (e.g., polycrystalline diamond elements). The races are positioned adjacent one another so that the bearing surfaces of the bearing elements contact one another. As may be appreciated, geometry and configuration of the bearing elements of the races may be an important factor influencing the performance and life of such a bearing structure. Examples of conventional radial bearing apparatuses are disclosed by U.S. Pat. Nos. 4,662,348, 4,729,440, 4,738,322, 4,756,631, and 4,764,036, the disclosure of each of which is incorporated, in its entirety, by this reference.

Thus, it would be advantageous to provide improved bearing elements and bearing apparatuses including same.

SUMMARY

The present invention relates generally to bearing elements and bearing apparatuses including contacting bearing surfaces comprising superhard materials. In one embodiment, the present invention relates to bearings including polycrystalline diamond inserts or compacts defining a plurality of surfaces that move relative to one another and contact one another. For example, the present invention relates to radial bearings, or other bearings including arcuate bearing surfaces that more in relation to one another, without limitation.

In one embodiment, the present invention relates to bearings including polycrystalline diamond inserts or compacts defining a plurality of surfaces that move relative to one another and contact one another. Such bearing apparatuses may encompass so-called thrust bearings, radial bearings, or other bearings including bearing surfaces that more in relation to one another, without limitation.

One aspect of the instant disclosure relates to a bearing apparatus. Particularly, a bearing apparatus may comprise a rotor including at least one bearing element mounted to the rotor and a stator including at least one bearing element mounted to the stator. The at least one bearing element of the rotor may define a bearing surface and the at least one bearing element of the stator may define another bearing surface. Further, at least one compliant member may be positioned between at least one selected bearing element of the at least one bearing element mounted to the rotor and the at least one bearing element mounted to the stator. The at least one compliant member may be configured to allow for a selected magnitude of variation in the orientation of a bearing surface of the at least one selected bearing element. Various mechanical systems may include such a bearing apparatus.

One aspect of the present invention relates to bearing elements. Particularly, one aspect of the present invention relates to a superhard bearing element comprising a superhard table forming an arcuate bearing surface. Further, such a superhard bearing element may comprise a chamfer formed about at least a portion of a periphery of the arcuate bearing surface.

Another aspect of the instant disclosure relates to polycrystalline diamond bearing elements. Particularly, one aspect of the present invention relates to a polycrystalline diamond bearing element comprising a polycrystalline diamond table forming an arcuate bearing surface. Further, such a polycrystalline diamond bearing element may comprise a chamfer formed about at least a portion of a periphery of the arcuate bearing surface.

Another aspect of the present invention relates to bearing apparatuses. More specifically, a bearing apparatus according to the present invention may comprise an inner race and an outer race. In further detail, the inner race may comprise a plurality of inner race superhard bearing elements, each comprising a superhard table, wherein at least one of the plurality of inner race superhard elements includes an inner arcuate bearing surface and a chamfer formed about at least a portion of a periphery of the inner arcuate bearing surface. In addition, the outer race may comprise a plurality of outer race superhard bearing elements each comprising a superhard table, wherein at least one of the plurality of outer superhard elements includes an outer arcuate bearing surface and a chamfer formed about at least a portion of a periphery of the outer arcuate bearing surface. Various mechanical systems may include such a bearing apparatus. In one embodiment, a bearing apparatus may be configured as a radial bearing apparatus included within a rolling cone drill bit.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

Further features of the subject matter of the instant disclosure, its nature, and various advantages will be more apparent from the following detailed description and the accompanying drawings, which illustrate various exemplary embodiments, are representations, and are not necessarily drawn to scale, wherein:

FIG. 1 shows a perspective view of a stator according to the present invention;

FIG. 2 shows a top elevation view of the stator shown in FIG. 1;

FIG. 3 shows a side cross-sectional view of the stator shown in FIGS. 1 and 2;

FIG. 24 shows a side cross-sectional view of a compliant member as shown in FIGS. 22 and 23;

FIG. 25 shows a perspective view of an inner race including a plurality of bearing elements coupled to the inner race;

FIG. 26 shows a perspective view of the bearing element as shown in FIG. 25;

DETAILED DESCRIPTION

Figure 4:
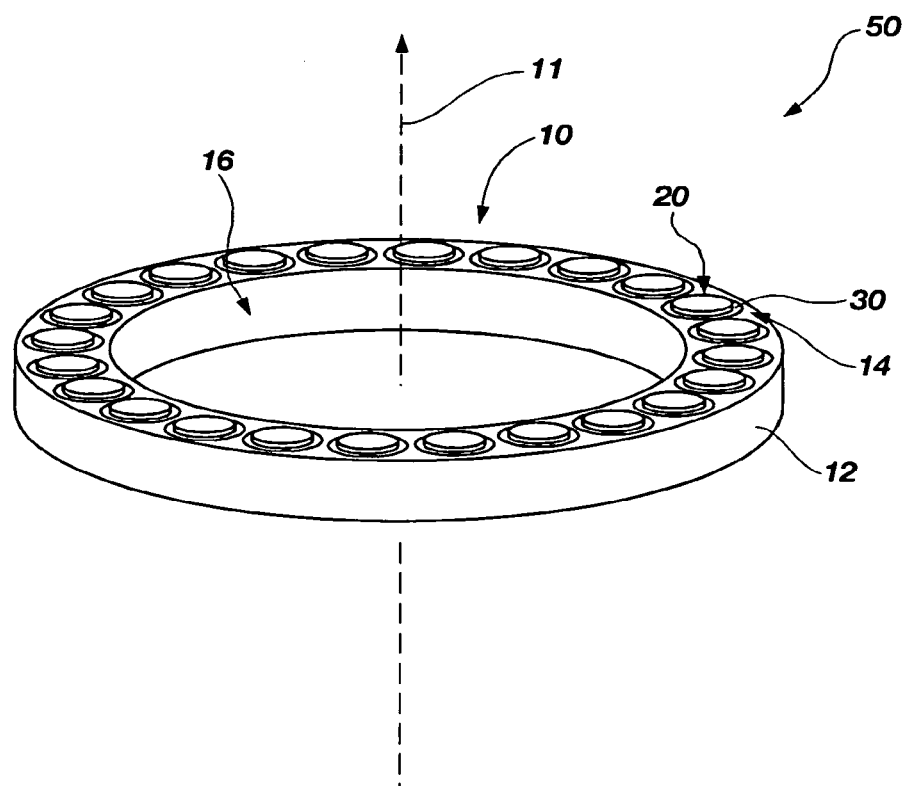
FIG. 4 shows a perspective view of a stator assembly including a stator as shown in FIGS. 1-3 and a plurality of bearing elements coupled to the stator.

The present invention relates generally to bearing apparatuses including bearing surfaces comprising superhard materials. "Superhard," as used herein, refers to any material having a hardness that is at least equal to or exceeds a hardness of tungsten carbide (e.g., polycrystalline diamond, boron nitride, silicon carbide, mixtures of the foregoing, or any suitable material). For example, a polycrystalline diamond compact (PDC) is normally fabricated by placing a cemented carbide substrate into a container or cartridge with a layer of diamond crystals or grains positioned adjacent one surface of a substrate. A number of such cartridges may be typically loaded into an ultra-high pressure press. The substrates and adjacent diamond crystal layers are then sintered under ultra-high temperature and ultra-high pressure ("HPHT") conditions. The ultra-high pressure and ultra-high temperature conditions cause the diamond crystals or grains to bond to one another to form polycrystalline diamond. In addition, as known in the art, a catalyst may be employed for facilitating formation of polycrystalline diamond. In one example, a so-called "solvent catalyst" may be employed for facilitating the formation of polycrystalline diamond. For example, cobalt, nickel, and iron are among examples of solvent catalysts for forming polycrystalline diamond. In one configuration, during sintering, solvent catalyst comprising the substrate body (e.g., cobalt from a cobalt-cemented tungsten carbide substrate) becomes liquid and sweeps from the region adjacent to the diamond powder and into the diamond grains. Of course, a solvent catalyst may be mixed with the diamond powder prior to sintering, if desired. Thus, diamond grains become mutually bonded to form a polycrystalline diamond table upon the substrate. A conventional process for forming polycrystalline diamond cutters is disclosed in U.S. Pat. No. 3,745,623 to Wentorf, Jr. et al., the disclosure of which is incorporated, in its entirety, by this reference. The solvent catalyst may remain in the polycrystalline diamond layer within the interstitial pores between the diamond grains or may be at least partially removed by leaching (i.e., exposing at least a portion of the diamond table to an acid) or by any suitable method. Optionally, another material may replace the solvent catalyst that has been at least partially removed from the polycrystalline diamond. In another embodiment, optionally, polycrystalline diamond may include nanodiamond (i.e., ultra-dispersed diamond), if desired. In another example, a silicon carbide and diamond composite material as disclosed in U.S. Pat. No. 7,060,641, the disclosure of which is incorporated herein, in its entirety, by this reference may comprise a bearing surface.

One aspect of the present invention relates generally to bearing apparatuses including a rotor and a stator wherein the rotor includes a plurality of bearing elements defining a bearing surface and the stator includes a plurality of bearing elements defining another bearing surface. Such bearing elements may comprise a superhard material, such as, for example, polycrystalline diamond. According to one aspect of the present invention, a compliant member may be positioned between at least one bearing element of the bearing apparatus. Such a compliant member may allow for variation in the orientation, position, or position and orientation of at least one of the bearing elements of the bearing apparatus. In addition, such a configuration may promote continued contact between the bearing surface of the rotor and the bearing surface of the stator. In addition, as described in greater detail below, such a compliant member may provide compressive contact between the bearing surface of the stator and the bearing surface of the rotor notwithstanding variations in the orientation, position, or both orientation and position of the bearing elements.

In one embodiment contemplated by the present invention, a stator may include at least one bearing element wherein a compliant member is positioned between the at least one bearing element mounted to the stator. For example, FIG. 1 shows a perspective view of stator 10 comprising body 12, which defines a plurality of recesses 14 each configured for accepting a bearing element positioned generally therein. As shown in FIG. 1, body 12 of stator 10 may be configured in a generally ring-shaped or toroid-shaped configuration and may define an aperture 16 which is generally centered about longitudinal axis 11.

As shown in FIG. 2, which shows a top elevation view of stator 10, body 12 of stator 10 may form a substantially cylindrical toroid-shaped geometry and, accordingly, aperture 16 may be substantially cylindrical. Further, recesses 15 may each be positioned at substantially the same radius (i.e., upon a common bolt circle) and may be substantially equally circumferentially spaced with respect to one another in relation to longitudinal axis 11. In addition, FIG. 2 shows that each of recesses 14 may include a counterbore feature 15. A counterbore feature 15 may embody, generally, any recess or depression that enlarges an opening of a recesses 14. Explaining further, counterbore feature 15 may comprise a relatively shallow recess having a larger cross-sectional size than a cross-sectional size of the recess 14 with which it is aligned. As shown in FIG. 2, counterbore feature 15 may be a substantially cylindrical depression which is substantially centered with respect to recess 14. FIG. 3 shows a side cross-sectional view of stator 10 taken through two recesses 14. As shown in FIG. 3, recesses 14 may extend at least partially through body 12 of stator 10. Also, FIG. 3 shows that counterbore features 15 may form a ledge or lip within each of recesses 14. Counterbore features 15 and corresponding ledges within recesses 14 may facilitate mounting of bearing elements within recesses 14.

Generally, one aspect of the present invention relates to positioning a compliant member between a bearing element mounted to either a rotor or a stator of a bearing apparatus. Thus, a compliant member may be positioned between a bearing element and a stator 10 as shown in FIGS. 1-3. For example, FIG. 4 shows a perspective view of stator assembly 50 including a plurality of bearing elements 20, wherein each bearing element 20 is positioned within a respective recess 14 of the plurality of recesses 14 formed in the body 12 of stator 10. More particularly, a compliant member 30 may be positioned between each of bearing elements 20 and each of recesses 14, respectively. Body 12 may be configured for supporting each of bearing elements 20 and may comprise a relatively rigid material having a relatively high yield strength and modulus of elasticity. For example, body 12 of stator 10 may comprise a high strength steel (e.g., 4140 AISI steel, or other high strength steel as known in the art).

Figure 5:
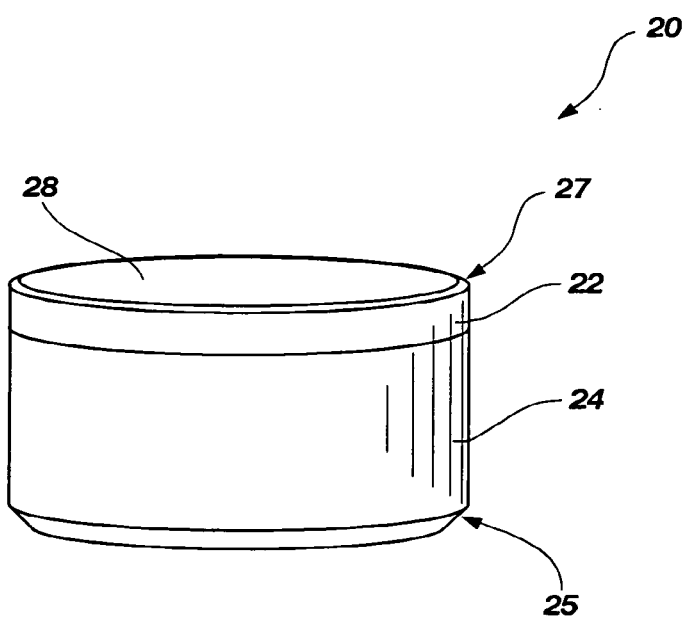
FIG. 5 shows a perspective view of a bearing element including a table bonded to a substrate.

FIG. 5 shows a perspective view of bearing element 20 including a table 22 bonded to a substrate 24. Table 22, as known in the art, may comprise a superhard material (e.g., polycrystalline diamond, cubic boron nitride, silicon carbide, or any other superhard material as known in the art). Such a configuration may provide a bearing surface 28 that is relatively wear resistant. Furthermore, table 22 includes a bearing surface 28 and may optionally include a chamfer 27. Bearing surface 28 may be substantially planar and may be configured to contact another bearing element (e.g., a bearing element coupled to a rotor) including another bearing surface that corresponds to bearing surface 28. In one embodiment, bearing element 20 may comprise a polycrystalline diamond compact ("PDC"), as known in the art. In such a configuration, substrate 24 may comprise a cobalt sintered tungsten carbide and table 22 may comprise polycrystalline diamond. As known in the art, polycrystalline diamond may include a catalyst (e.g., cobalt, nickel, iron, or any other catalyst as known in the art) to facilitate formation of polycrystalline diamond. Optionally, at least a portion of a catalyst within table 22 may be removed (e.g., by acid leaching or as otherwise known in the art). As shown in FIG. 5, bearing element 20 may be substantially cylindrical.

Figure 6:
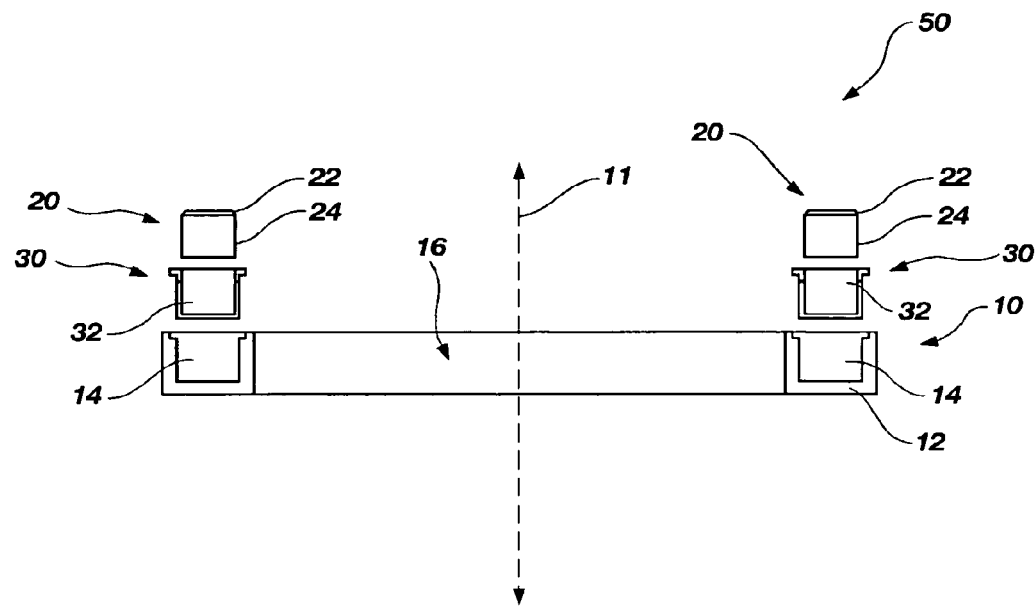
FIG. 6 shows a partial, exploded, side cross-sectional assembly view of the stator assembly shown in FIG. 4.

As shown in FIG. 6, compliant member 30 may include recess 32 configured for accepting a bearing element 20. Further, compliant member 30 may be configured to generally correspond to the shape of recess 14 formed in body 12 of stator 10. Thus, compliant member 30 may be configured to surround at least a portion of a periphery (e.g., a circumference) of bearing element 20 and may provide a desired level of compliance between such a bearing element 20 and recess 14. Accordingly, compliant member 30 may comprise a material having a relatively moderate modulus of elasticity (e.g., between about 5,000 ksi and about 30,000 ksi). For example, compliant member may comprise materials including, but not limited to, aluminum, copper, titanium, brass, or bronze. Such a configuration may allow for variation in the position, orientation, or position and orientation of bearing element 20 when it is positioned generally within a recess 14. Explaining further, a force or a moment applied to bearing element 20 may cause elastic deformation of compliant member 30.

Figure 7:
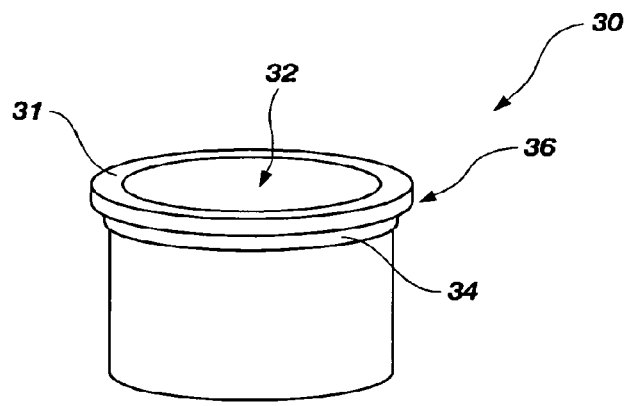
FIG. 7 shows a perspective view of one embodiment of a compliant member according to the present invention.
Figure 8:
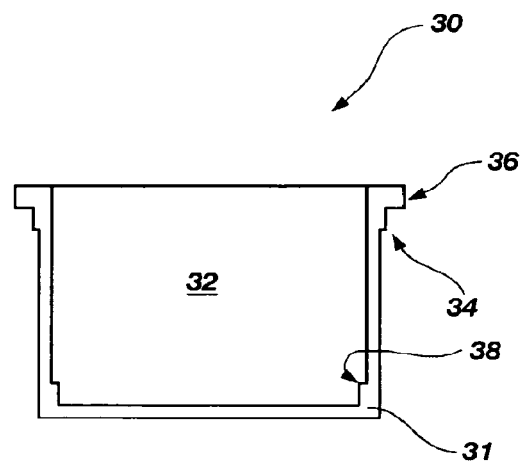
FIG. 8 shows a side cross-sectional view of the compliant member shown in FIG. 7.

FIG. 7 shows a perspective view of one embodiment of a compliant member. More particularly, FIG. 7 shows a compliant member 30 which is generally tubular and substantially cylindrical. Further, compliant member 30 defines a generally cylindrical recess 32 at its closed end. Further, FIG. 8 shows a side cross-sectional view of the compliant member 30 shown in FIG. 7. As shown in FIGS. 7 and 8, compliant member 30 includes a flange 36, an outer lip 34, and an inner lip 38. Flange 36 may be configured to fit within (i.e., with clearance between) counterbore feature 15 of recess 14 formed in stator 10. Optionally, outer lip 34 may be configured for at least partially interfering with the bore of recess 14, if desired, which may facilitate retention of compliant member 30 within recess 14. Optionally, inner lip 38 may be configured to interfere with an outer periphery of a bearing element 20. Such a configuration may facilitate retention of a bearing element 20 within a compliant member 30 positioned within a recess 14 of stator 10 or may separate a lower surface of bearing element 20 from a lower surface of compliant member 30, as discussed below. Compliant member 30 may be configured to exhibit a selected level of elastic deformation for compliance, which may allow a bearing element associated therewith to exhibit variation in its orientation and/or position.

Figure 9:
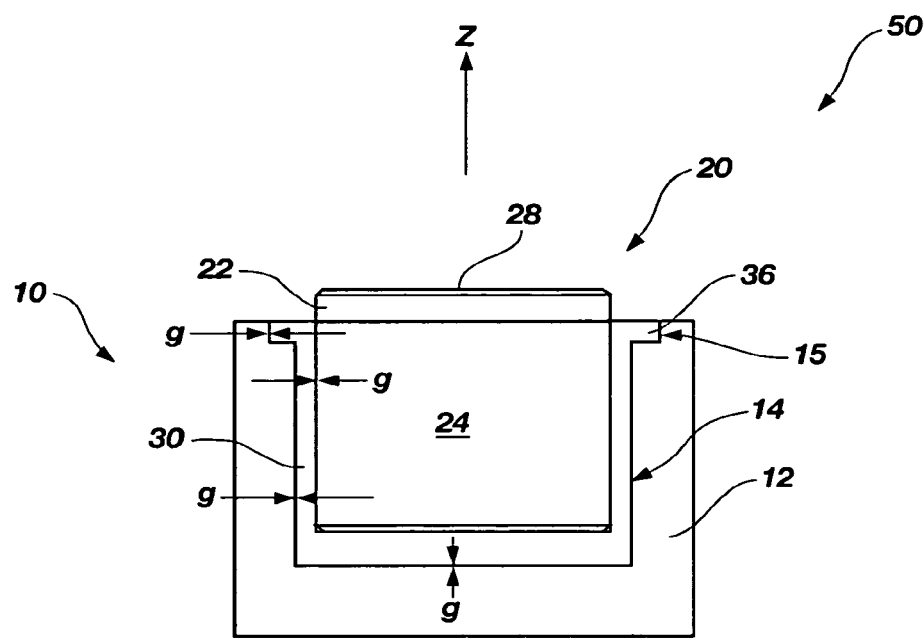
FIG. 9 shows a partial, schematic, side cross-sectional view of a bearing element and compliant member positioned generally within a recess of a stator.

FIG. 9 shows a partial, schematic, side cross-sectional view of stator 10, illustrating a bearing element 20 and a compliant member 30 positioned within recess 14. Axis Z is shown, however, the cross section of bearing element 20, compliant member 30, and recess 14 shown in FIG. 9 is generic, which means that it may embody any selected plane taken through such elements. As shown in FIG. 9, flange 36 may be positioned generally within counterbore feature 15 (outer lip 34 and inner lip 38, as shown in FIGS. 7 and 8, are omitted for clarity). It may be appreciated that compliant member 30 may fit within recess 14 of stator 10 with clearance. In addition, optionally, bearing element 20 may fit within compliant member with clearance. More particularly, as shown in FIG. 9, gaps (labeled "g") of between about 0.002 inches and 0.005 inches may exist between a peripheral side surface of the compliant member 30 and the recess 14. Further, as shown in FIG. 9, a gap (labeled "g") of between about 0.002 inches and 0.005 inches may exist between a lower surface of the compliant member 30 and a lower surface defining a portion of recess 14. As a further variation, a lower surface of bearing element 20 may be offset from a lower surface of compliant member 30 (e.g., by a gap "g"), if desired. Thus, as may be appreciated, compliant member 30, recess 14, and bearing element 20 may allow for variation in the position of bearing element 20 along a lateral direction (i.e., substantially perpendicular to longitudinal direction Z, which may be either a circumferential direction, a radial direction, or both) and along a longitudinal direction Z. In one embodiment, compliant member 30 may support bearing element 20 within recess 14, wherein recess 14 and a periphery of compliant member 30 are substantially separated. Of course, the relative size of gaps g may be adjusted to provide a selective magnitude of movement or play (and corresponding flexibility behavior or spring constant) to a bearing element 20. Thus, it may be appreciated that bearing element 20 may be displaced circumferentially (i.e., about longitudinal axis 11), radially (outwardly or inwardly with respect to longitudinal axis 11), or both, depending on the forces applied to bearing element 20. Similarly, bearing element 20 may be displaced upwardly along axis Z or downwardly along axis Z depending on the force applied to bearing element 20 in a longitudinal direction. Of course, such displacements may cause an orientation of bearing surfaces 28 of bearing elements 20 to vary.

Figure 10:
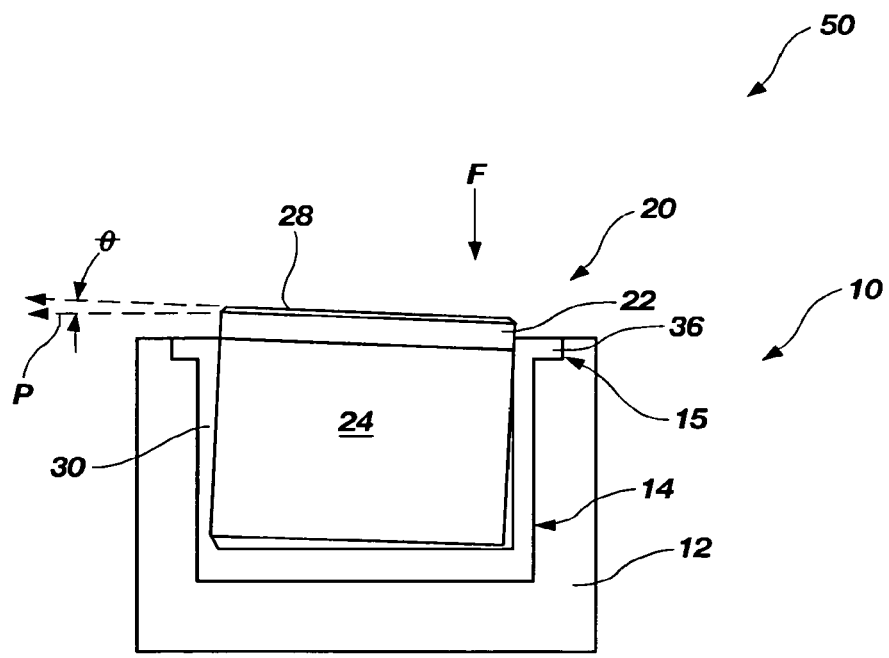
FIG. 10 shows a partial, schematic, side cross-sectional view of the bearing element and compliant member shown in FIG. 9, wherein an orientation of a bearing surface of the bearing element varies with respect to a desired orientation.

Explaining further, compliant member 30 may be configured to allow a selected level of variation in the orientation of bearing surface 28. As shown in FIG. 10, angle θ may be formed between a reference plane P and bearing surface 28. Although bearing surface 28 is depicted in FIG. 10 as being substantially planar, the present invention contemplates that bearing surface 28 may be arcuate or may be configured as otherwise known in the art. Thus, if bearing surface 28 is arcuate, angle θ may be measured between a selected position (e.g., a line) of the arcuate bearing surface and reference plane P. In one embodiment, angle θ may vary (i.e., compliant member 30 may be structured to allow angle θ to vary) within about .+−.2° of a desired orientation (e.g., reference plane P). More specifically, variation of angle θ within about .+−.1° of a desired orientation (e.g., reference plane P) may be ample for most applications. Within such orientation variation, compliant member 30 may be configured to exhibit elastic deformation. Such a configuration may allow for an orientation of bearing element 20 (e.g., bearing surface 28) to change during the operation of a bearing apparatus. The cross section shown in FIG. 10 is merely schematic and may embody any selected cross section (of the components) taken in any selected direction, without limitation. Accordingly, orientation of bearing surface 28 may vary (e.g., tip or tilt) in any direction or manner. Thus, it may be appreciated that during operation of a bearing apparatus, a force F applied to a portion of bearing element 20, as shown in FIG. 10, may cause the bearing surface 28 of bearing element 20 to change its orientation.

Such a force F may be generated via contact between bearing elements coupled to a stator and rotor, as known in the art. The present invention contemplates that a compliant member positioned between at least one bearing element of either a stator or a rotor or both a stator and a rotor may be advantageous to allow for variation in an orientation, position, or orientation and position of such at least one bearing element.

Figure 11:
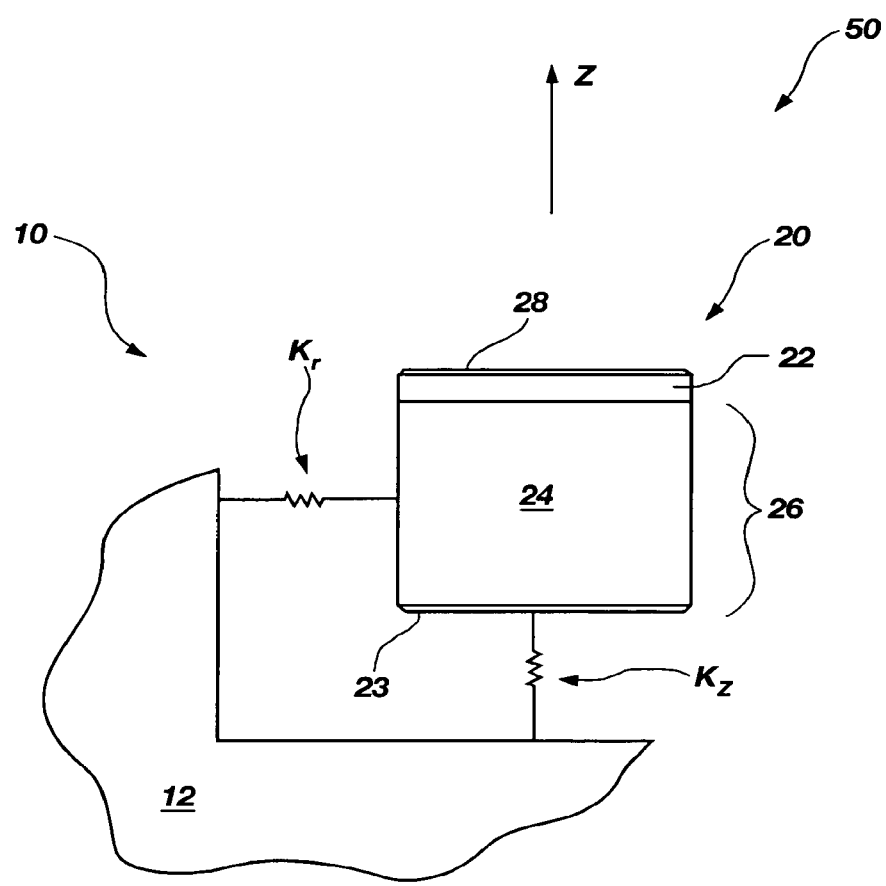
FIG. 11 shows a schematic view of a bearing element coupled to a stator by a plurality of biasing elements.
Figure 12:
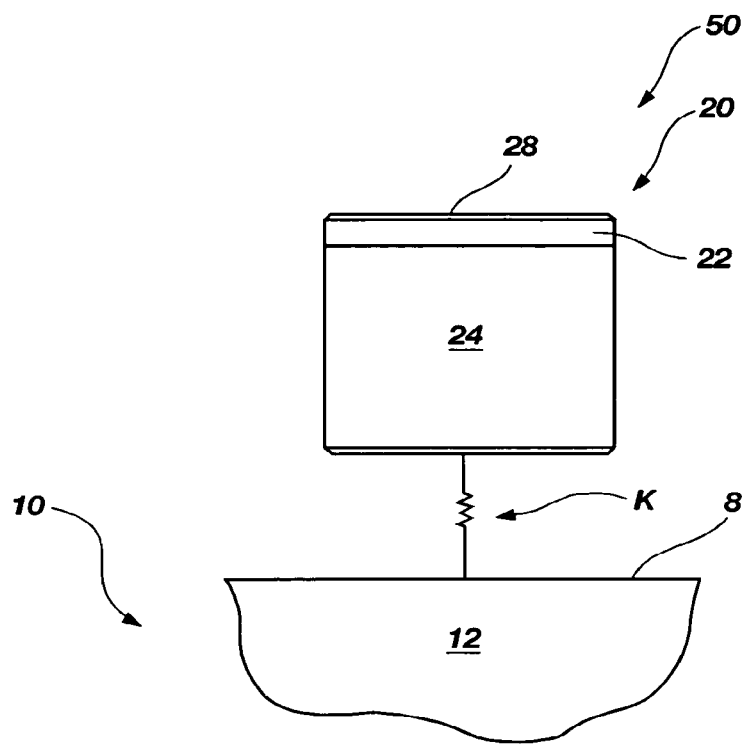
FIG. 12 shows a schematic view of a bearing element coupled to a stator by one biasing element.

More conceptually, the present invention contemplates that at least one biasing element positioned between a bearing element and a stator (or a rotor). For example, FIG. 11 shows a schematic view of a bearing element 20 coupled to the body 12 of stator 10 by biasing elements $K_r$ and $K_z$. Thus, it may be appreciated that a spring constant or stiffness may be selected for each of biasing elements $K_r$ and $K_z$ to provide a selected level of compliance in a longitudinal direction Z and a lateral direction, respectively. In one embodiment, biasing element $K_r$ and biasing element $K_z$ may function substantially independently. For example, a compliant sleeve may be positioned about at least a portion of a side periphery 26 (e.g., an outer diameter or circumference) to provide a biasing element between body 12 of stator 10 and bearing element 20. Further, a disc-shaped biasing element $K_z$ (e.g., a washer spring or other spring as known in the art) may be positioned between a lower surface 23 of bearing element 20 and a body 12 of stator 10. Thus, conceptually, radial compliance, circumferential compliance, and longitudinal compliance may be independent of one another. In other embodiments, radial compliance, circumferential compliance, and longitudinal compliance may be interdependent.

Figure 13:
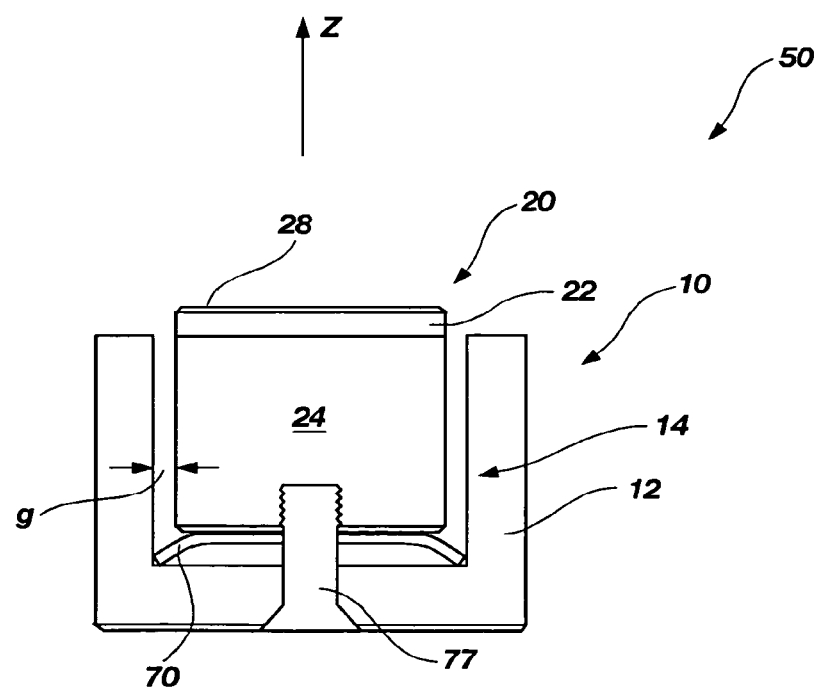
FIG. 13 shows a partial, schematic, side cross-sectional view of a bearing element coupled to a stator, wherein a washer spring is positioned between the bearing element and the stator.

In another embodiment, a biasing element K may be positioned between bearing element 20 and body 12 of stator 10. Biasing element K may be configured to provide compliance with respect to a position, an orientation, or both in at least one direction or degree of freedom. For example, biasing element K may allow for variation in an orientation of bearing surface 28 and, optionally, may allow for variation in a longitudinal position of bearing surface 28 of bearing element 20. For example, FIG. 13 shows a partial, schematic, side cross-sectional view of a stator assembly 50 including a washer spring 70 (e.g., a wave spring washer, a curved spring washer, or a Belleville spring washer) positioned between a bearing element 20 and a recess 14 formed in the body 12 of stator 10. As shown in FIG. 13, recess 14 may be larger than substrate 24 of bearing element 20. Thus, a gap "g" may be provided between a sidewall of substrate 24 and a sidewall of recess 14. Gap g may be between about 0.002 inches and 0.005 inches, without limitation. Such a configuration may allow for bearing element 20 to be displaced generally within recess 14 (e.g., radially, circumferentially, or longitudinally). Further, such configuration may allow for variation in the orientation of bearing surface 28, as discussed above with respect to FIG. 10. Optionally, a fastening element 77 (e.g., a threaded fastener or other fastener as known in the art) may couple the substrate 24 of bearing element 20 to stator 10 to prevent the bearing element from being removed from recess 14. However, such a fastening element 77 may be configured to allow for a selective range of movement (e.g., longitudinal and orientation of the bearing surface 28) of the bearing element 20 within recess 14 of stator 10 (i.e., against washer spring 70). In addition, such a configuration may allow for the bearing elements of the rotor and the stator to be compressively forced against one another, as discussed in further detail below. Also, it may be understood that such compressive force may be desirable for retaining bearing element 20 generally within recess 14 formed within the body 12 of stator 10.

Figure 14:
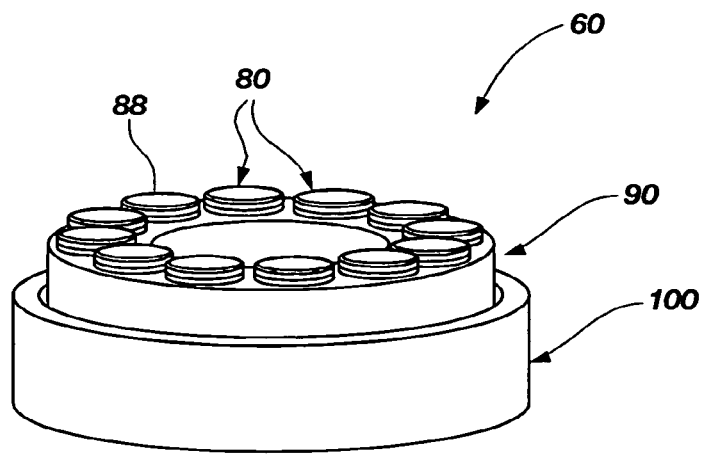
FIG. 14 shows a perspective view of a rotor assembly including a rotor and a rotor base.

FIG. 14 shows a perspective view of rotor assembly 60 including bearing elements 80, rotor 90, and rotor base 100. As known in the art, rotor 90 and rotor base may be substantially cylindrical and may be affixed to one another. As shown in FIG. 14, rotor 90 may comprise a generally ring-shaped body that may be coupled to rotor base 100. In addition, bearing elements 80 may be configured so that alignment and rotation of rotor assembly 60 with stator assembly 50 results in at least one bearing surface 28 of a bearing element 20 being in substantially constant contact with at least one respective bearing surface 88 of bearing elements 80. Put another way, upon rotation of rotor assembly 60 a bearing surface 88 of a bearing element 80 contacts a circumferentially adjacent bearing surface 28 of a bearing element 20 prior to loss of contact with a circumferentially proceeding bearing surface 28 of a bearing element 20. Of course, many embodiments relating to the arrangement of bearing elements associated with a rotor and bearing elements associated with a stator are contemplated by the present invention and any configurations as known in the art may be employed within a bearing apparatus according to the present invention.

Figure 15:
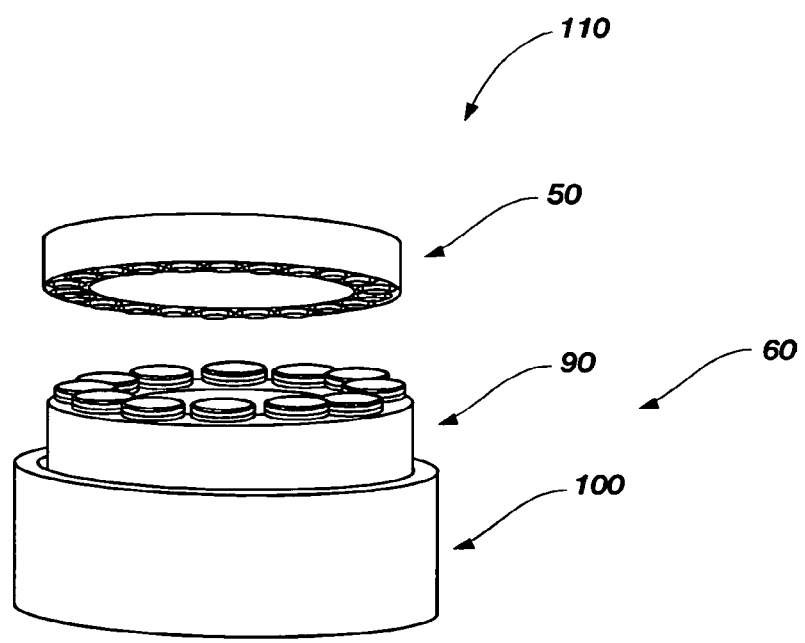
FIG. 15 shows a perspective view of a bearing apparatus according to the present invention including a stator assembly and a rotor assembly.

From the foregoing description, it may be appreciated that a rotor assembly 60 and a stator assembly 50 may be used in combination with one another to form a bearing apparatus. For example, FIG. 15 shows a perspective view of a bearing apparatus 110 including stator assembly 50 and rotor assembly 60. During use, rotor assembly 60 and stator assembly 50 may be aligned with one another and the bearing surfaces 28 of bearing elements 20 may be in contact with the bearing surfaces 88 of bearing elements 80, respectively. Of course, rotor assembly 60 and stator assembly 50 may be affixed to a system to provide a thrust bearing structure. It should also be appreciated that the terms "rotor" and "stator" refer to rotating and stationary portions of a bearing apparatus, respectively, and, therefore, "rotor" and "stator" may refer to identical components configured to rotate and remain stationary, respectively. It should be appreciated that rotor 90 may include at least one compliant member positioned between at least one bearing element 80 and the body defining rotor 90. Summarizing, at least one of bearing elements 20 or bearing elements 80 may be coupled to stator 10 or rotor 90, respectively, via a compliant member. In one embodiment, as described above, each of the plurality of bearing elements 20 may be coupled to stator 10 via a respective compliant member. In another embodiment, each of bearing elements 80 may be coupled to rotor 90 by a respective compliant member.

Figure 16:
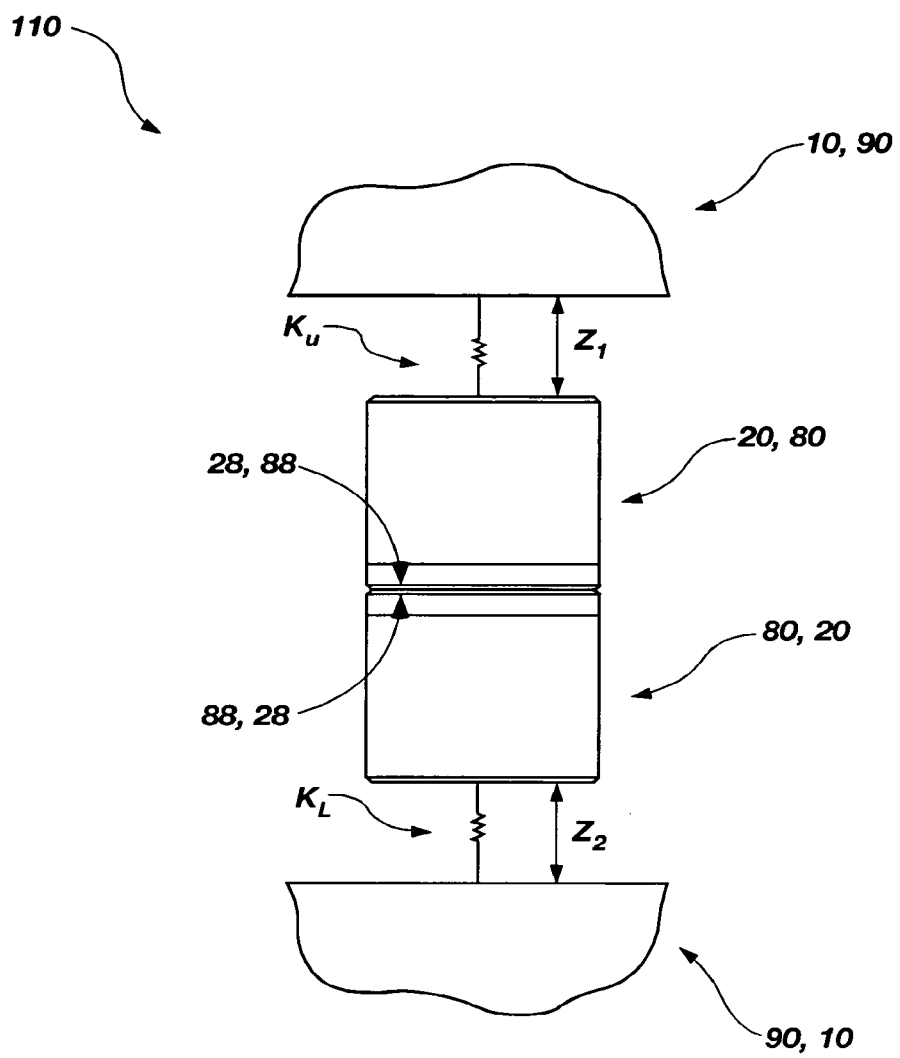
FIG. 16 shows a partial, schematic view of a bearing apparatus, wherein respective compliant members are positioned between respective bearing elements of a stator and a rotor.
Figure 17:
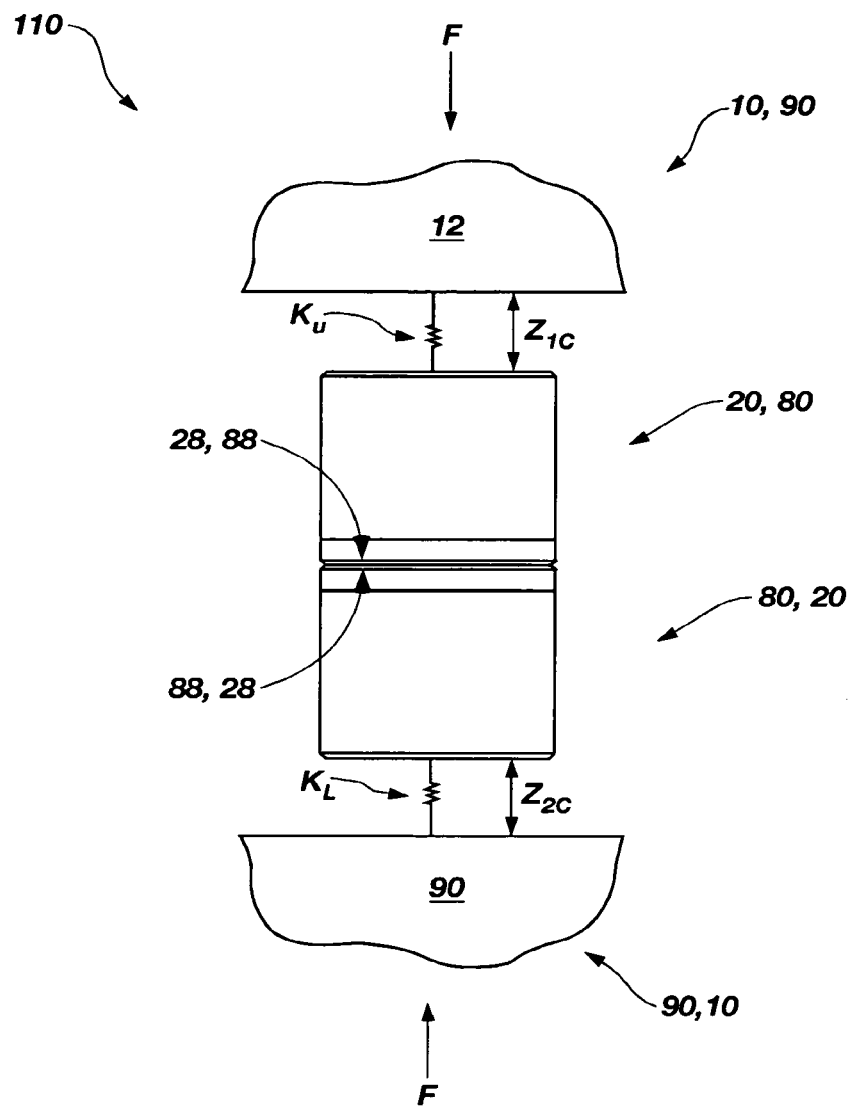
FIG. 17 shows a schematic view of the bearing apparatus shown in FIG. 16, wherein the rotor and stator are compressed toward one another.
Figure 18:
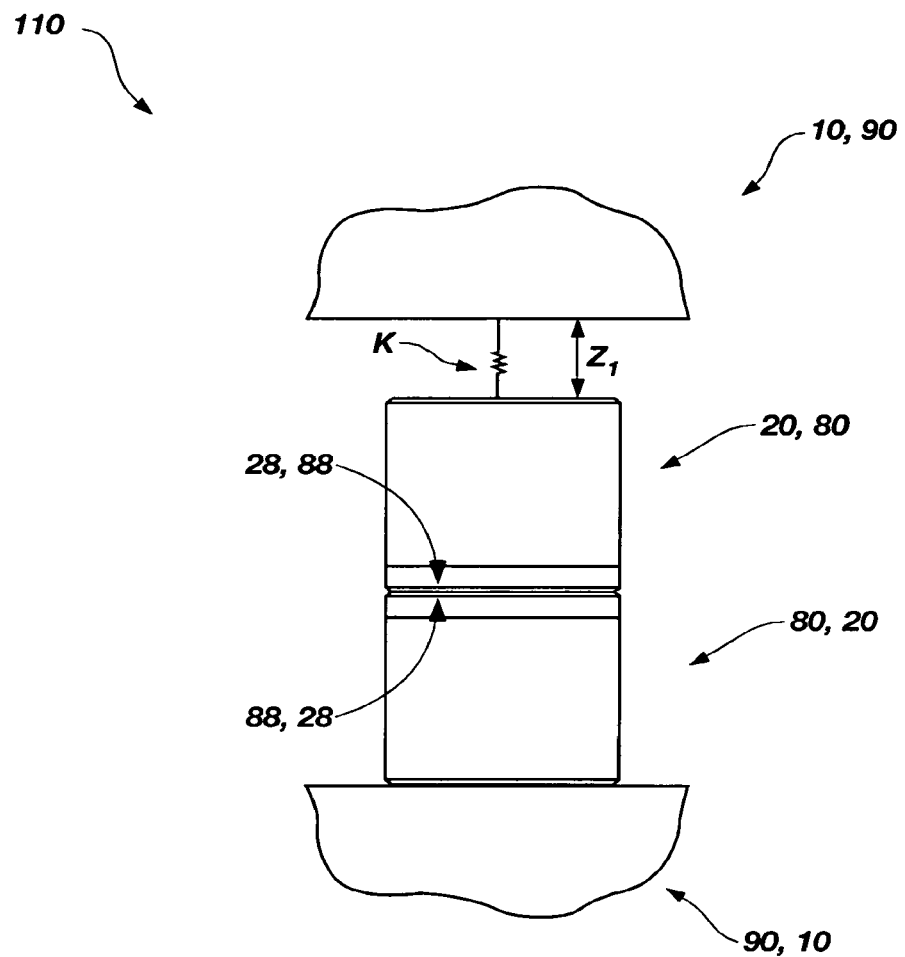
FIG. 18 shows a schematic view of a bearing apparatus, wherein a compliant member is positioned between at least one bearing element of a rotor or a stator.
Figure 19:
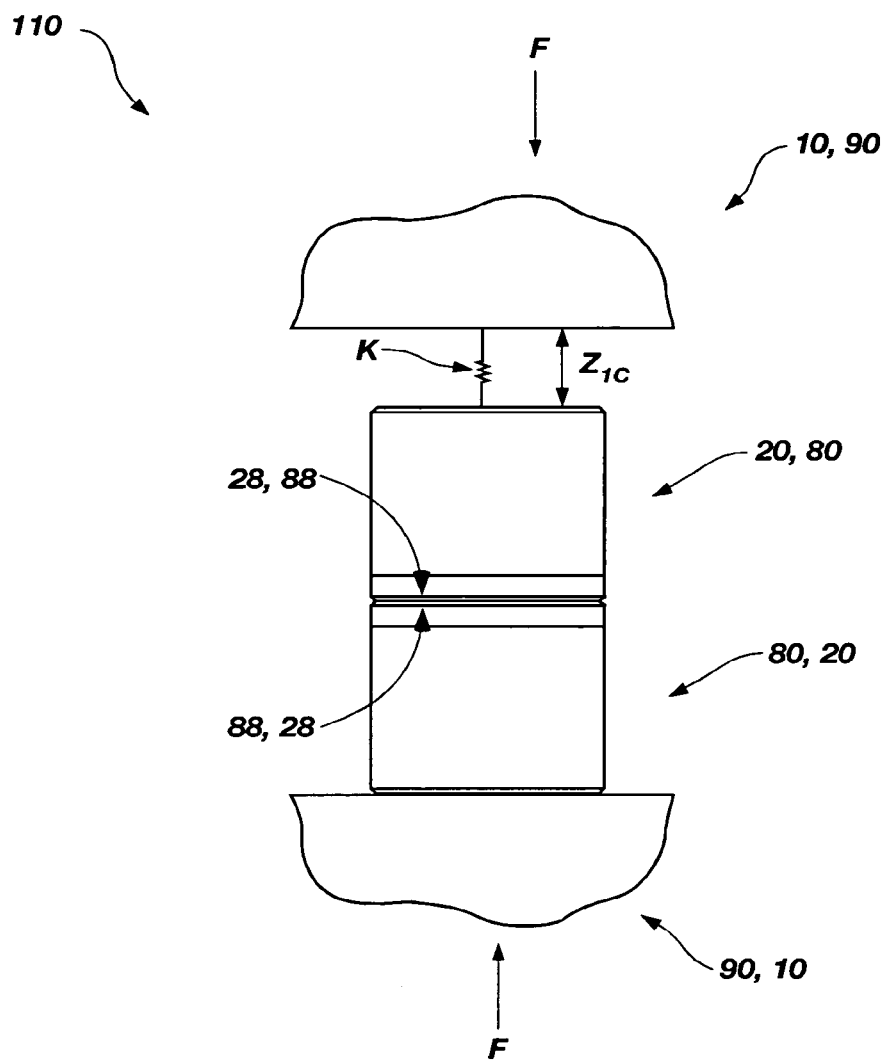
FIG. 19 shows a schematic view of the bearing apparatus shown in FIG. 18 wherein the rotor and the stator are compressed toward one another.

FIG. 16 shows a schematic view of a bearing apparatus 110 including a rotor 90 and a stator 10 wherein compliant members $K_u$ and $K_l$ are positioned between the bearing elements 20, 80 of stator 10 and rotor 90, respectively. As shown in FIG. 16, bearing surfaces 28, 88 may initially contact one another and may be positioned away from stator 10 and rotor 90 by longitudinal distances $Z_1$ and $Z_2$. Although bearing elements 20, 80 are shown as being substantially identical in FIG. 16 it should be understood that such a representation is merely illustrative and not drawn to scale. Therefore, bearing elements 20, 80 may be configured as described above or as otherwise known in the art, without limitation. FIG. 17 shows the bearing apparatus 110 as shown in FIG. 16, wherein a compressive force F is applied to stator 10 and rotor 90. As shown in FIG. 17, compressive force F may cause bearing elements 20, 80 to be positioned with respect to stator 10 and rotor 90 at respective longitudinal distances $Z_{1c}$ and $Z_{2c}$, wherein $Z_{1c}$ is less than $Z_1$ and $Z_{2c}$ is less than $Z_2$. Accordingly, it may be appreciated that compliant members $K_u$ and $K_l$ are compressed by compressive force F. Of course, as shown in FIGS. 18 and 19, more generally, at least one compliant member K may be positioned between at least one bearing element 20, 80 of a stator 10 or rotor 90. Similar to the above-described embodiment, a compressive force F may cause bearing element 20, 80 to be positioned at respective longitudinal distances $Z_1$ and $Z_{1c}$, wherein $Z_{1c}$ is less than $Z_1$, as shown in FIGS. 18 and 19. Such a compressive force F (FIGS. 17 and 19) may be referred to as a "preload" between the rotor and stator and may be applied by a clamping device or other device as known in the art, which maintains the compressive force during relative rotation between stator 10 and rotor 90. For example, in one embodiment, a clamping device may include at least one rolling element configured to roll along a surface of at least one of stator 10 and rotor 90 while providing a compressive force therebetween.

Figure 20:
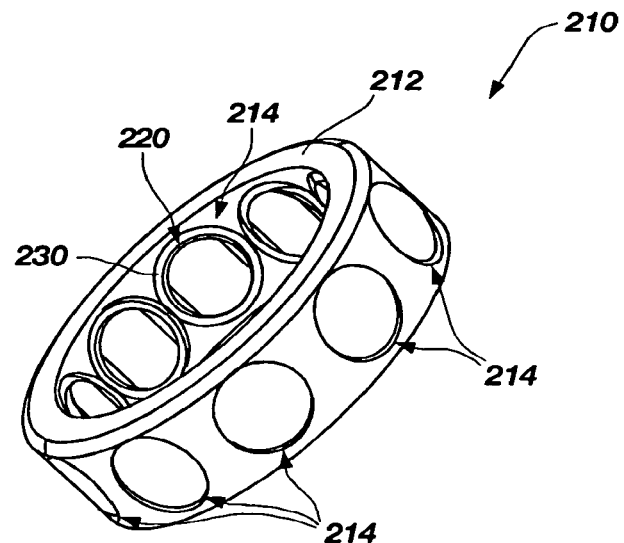
FIG. 20 shows a perspective view of an outer race including a plurality of bearing elements coupled to the outer race.
Figure 21:
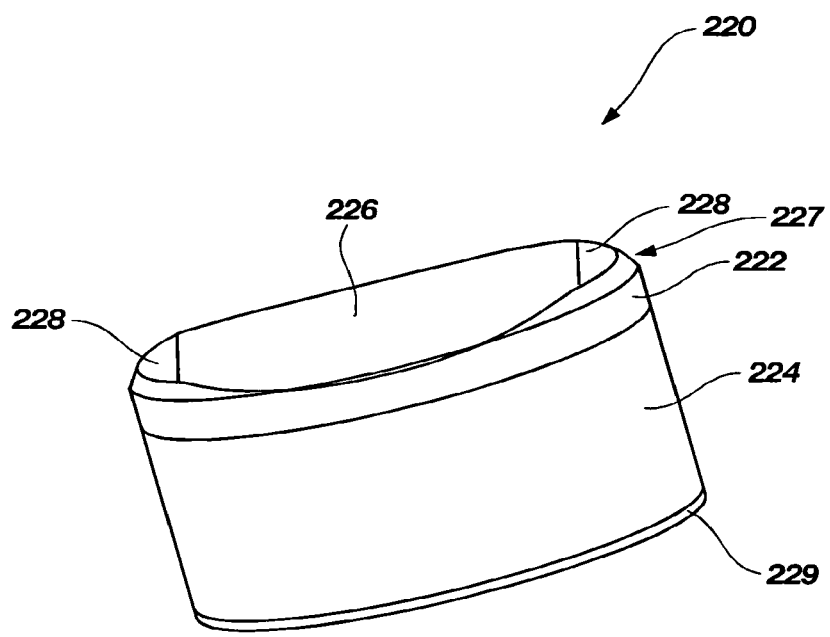
FIG. 21 shows a perspective view of the bearing element shown in FIG. 20.

The present invention further contemplates that at least one compliant member may be included within a radial bearing apparatus that includes a first plurality of bearing elements collectively defining a first bearing surface and a second plurality of bearing elements collectively defining a second bearing surface. For example, FIG. 20 shows a perspective view of an outer race 210 including a plurality of bearing elements 220. More specifically, outer race 210 may comprise a body 212 defining a plurality of recesses 214 within which bearing elements 220 may be positioned, respectively. Further, in the embodiment shown in FIG. 20, a compliant member 230 may be positioned between each of the bearing elements 220 and the recesses 214 of outer race 210. Also, FIG. 21 shows a perspective view of bearing element 220, which may be generally configured as described above with respect to bearing elements 20 and 80. Thus, bearing element 220 includes a table 222 bonded to a substrate 224 wherein table 222 defines a bearing surface 226. However, as shown in FIG. 21, bearing surface 226 may be substantially concave. In one embodiment, bearing surface 226 may comprise a portion of a substantially cylindrical surface. In addition, bearing element 220 may optionally include substantially planar surfaces 228 and a chamfer 227. Also, substrate 224 may optionally include a chamfer 229, as shown at FIG. 21.

Figure 22:
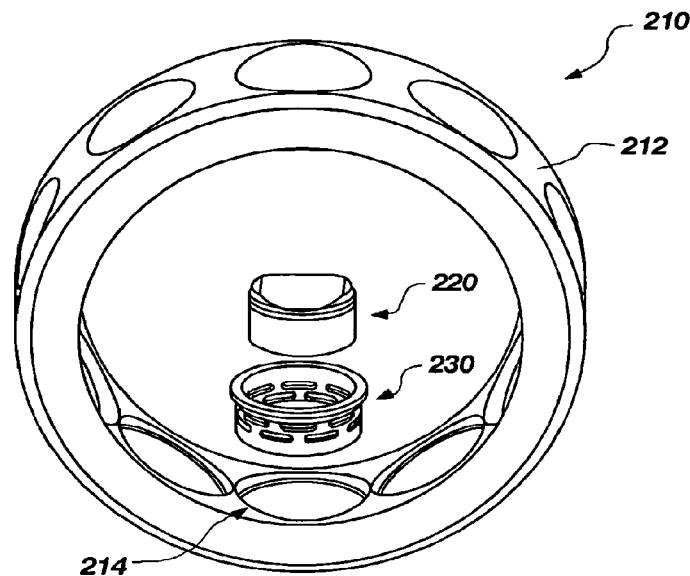
FIG. 22 shows a partial, exploded, assembly view of the outer race shown in FIG. 20.
Figure 23:
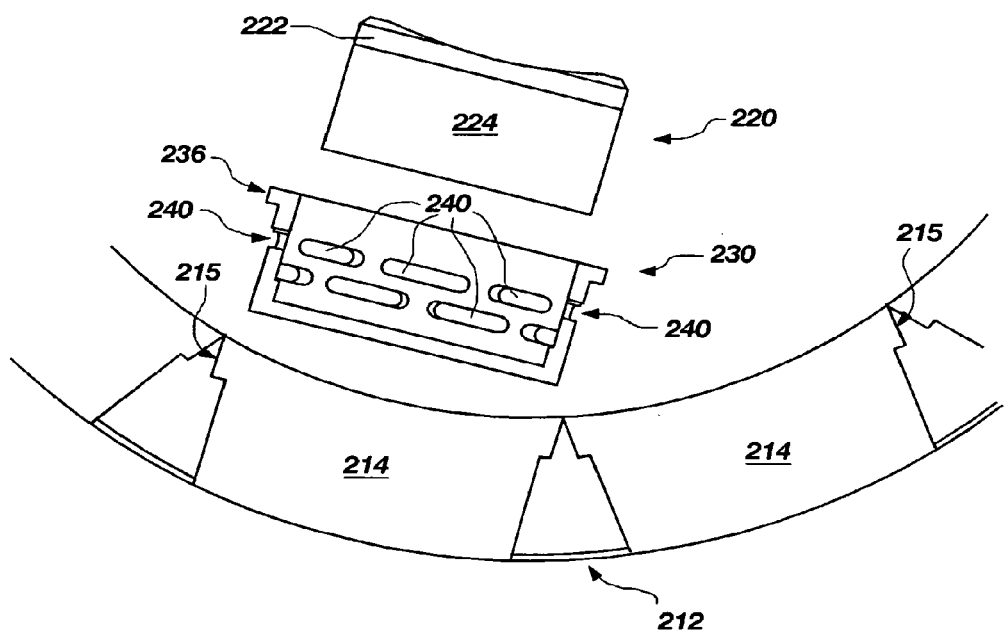
FIG. 23 shows a partial, side cross-sectional view of the outer race shown in FIG. 22.

FIG. 22 shows a partial exploded assembly view of outer race 210 including one bearing element 220 and its associated compliant member 230. In further detail, FIG. 23 shows a partial, side cross-sectional view of the partial assembly of outer race 210 shown in FIG. 22. As shown in FIGS. 22 and 23, compliant member 230 may include a plurality of apertures 240 formed therethrough. Such apertures 240 may be configured to provide a selected level of compliance to a bearing element positioned therein. Apertures 240 are shown in FIGS. 24 and 25 to be circumferentially spaced about the cylindrical sidewall of compliant member 230. However, the present invention contemplates other embodiments for apertures 240. For instance, apertures 240 may be formed in a longitudinal direction about the circumference of the compliant member to form a plurality of tines or prongs extending from the bottom or closed end of the compliant member. In another embodiment, apertures 240 may be formed through the bottom or closed end of compliant member 230. Otherwise, compliant member 230 may be generally configured similarly to compliant member 30 as described above. Particularly, FIG. 24 shows a side cross-sectional view (omitting apertures 240, for clarity) including flange 236, outer lip 234, and inner lip 238 formed by body 231 of compliant member 230. Thus, summarizing, a plurality of bearing elements 230 may be coupled to the body 212 of outer race 210 so that each bearing surface 226 of the bearing elements 220 collectively form a bearing surface for a radial bearing apparatus.

Figure 27:
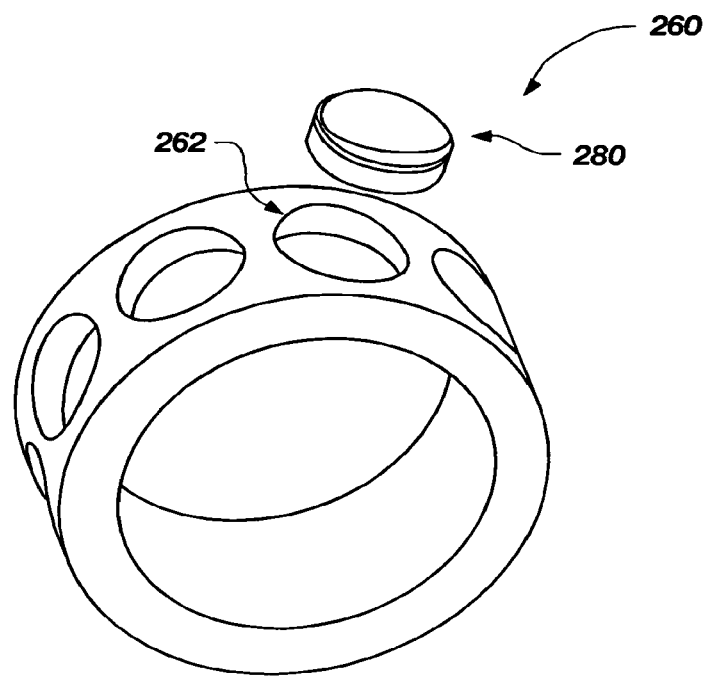
FIG. 27 shows a partial, exploded assembly view of the inner race shown in FIG. 25.
Figure 28:
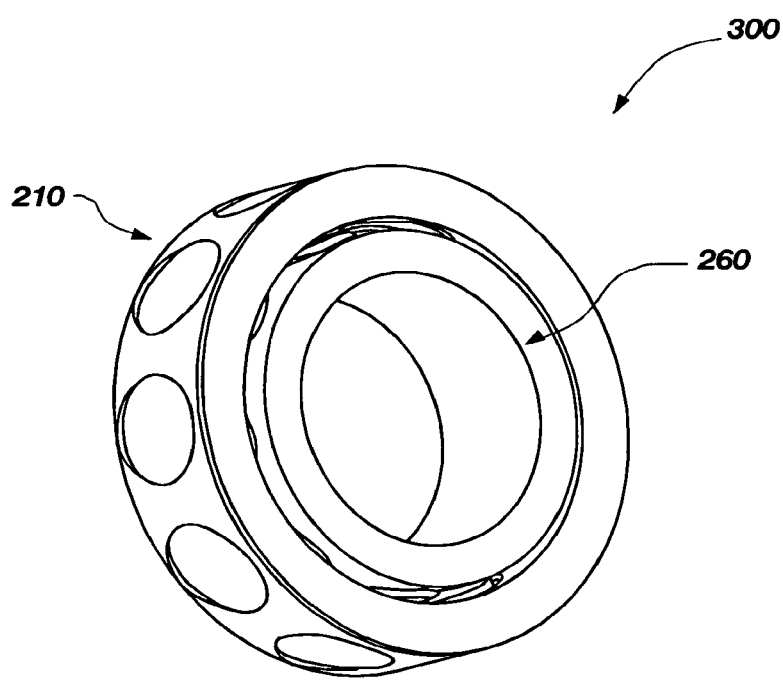
FIG. 28 shows a perspective view of a radial bearing assembly according to the present invention.

Accordingly, the present invention contemplates that an inner race may be positioned within the outer race and may include a bearing surface defined by a plurality of bearing elements wherein each of the bearing elements has its own bearing surface. For example, FIG. 25 shows a perspective view of an inner race 260 including a plurality of bearing elements 280 positioned generally within recesses 262. Generally, bearing elements 280 may each include a bearing surface configured to correspond with the bearing surface of each of bearing elements 220. More specifically, FIG. 26 shows a perspective view of bearing element 280 including a bearing surface 288 configured as a substantially convex surface. In one embodiment, bearing surface 288 may comprise a portion of a substantially cylindrical surface. Further, bearing element 280 includes a chamfer 287 formed on table 278, wherein table 278 is bonded to a substrate 276, which may include a chamber 279. Thus, it may be appreciated that bearing elements 280 may be coupled to the body 261 of inner race 260 to form an inner race assembly. In further detail, FIG. 27 shows a partial exploded, assembly view of inner race 260 including a bearing element 280 positioned proximate to its associated recess 262. Bearing element 280 may be positioned generally within recess 262 and coupled to the body 261 of inner race 260. For instance, bearing element 280 may be adhesively bonded, brazed, welded, fastened, or otherwise affixed to the body 261 of inner race 260 as known in the art. Thus, inner race 260 and outer race 210 may be configured so that the bearing surfaces (collectively defined by the plurality of bearing elements 280 and the plurality of bearing elements 220) may at least partially contact one another. FIG. 28 shows a perspective view of a radial bearing apparatus 300 including inner race 260 positioned generally within outer race 210. As explained above, at least one bearing element 220, 280 may be preloaded (i.e., against one another, respectively) during the assembly of radial bearing apparatus 300. Such a configuration may provide a radial bearing apparatus that withstands vibrations as well as variations in the relative position of inner race and outer race without sustaining damage. It should be understood (as explained above with respect to the terms "rotor" and "stator") that inner race 260 and outer race 210 may be described as a rotor and a stator, or vice versa, depending on how the inner race 260 and the outer race 210 are configured to move relative to one another. Of course, such a radial bearing apparatus may be included within a mechanical system. For instance, so-called "roller cone" rotary drill bits may benefit from a radial bearing apparatus contemplated by the present invention. More specifically, it may be appreciated that an inner race may be mounted or affixed to a spindle of a roller cone and an outer race may be affixed to an inner bore formed within a cone and that such an outer race and inner race may be assembled to form a radial bearing apparatus. Such a radial bearing apparatus may be advantageous because of its ability to withstand relatively high temperatures and its wear resistance. Accordingly, it is contemplated that a radial bearing apparatus may be cooled by a drilling fluid (i.e., a drilling mud) used to carry cuttings from a leading end of a bore hole upward to the surface of a subterranean formation, as known in the art.

Figure 29:
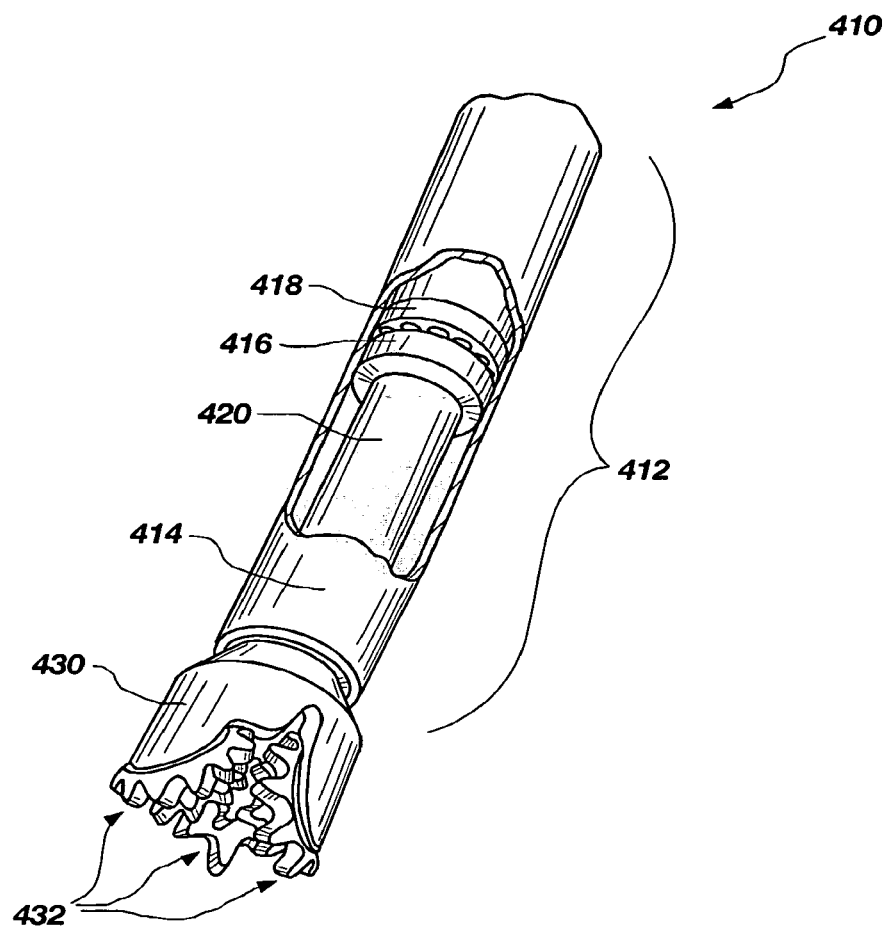
FIG. 29 shows a perspective view of a subterranean drilling system including a thrust bearing apparatus according to the present invention.

As mentioned above, the bearing apparatuses disclosed above may be incorporated into a mechanical system. For example, FIG. 29 shows a perspective view of a subterranean drilling system 410 incorporating a thrust bearing apparatus according to the present invention. In particular, as known in the art, a rotary drill bit 430 may be rotated by downhole drilling motor assembly 412. Downhole drilling motor assembly 412 may be located at the end of a series of pipe sections comprising a drill string. The housing 414 of downhole drilling motor assembly 412 remains stationary as rotary drill bit 430 rotates. In further detail, output shaft 420 of downhole drilling motor assembly 412 may be coupled to rotary drill bit 430 and drilling fluid (i.e., drilling mud) may cause torque to be applied to the output shaft 420 and to rotary drill bit 430. Rotary drill bit 430 is shown as a so-called "roller cone" type bit including roller cones 432, but may be a fixed cutter (e.g., a drill bit including polycrystalline diamond cutting elements or compacts) or any other rotary drill bit or drilling tool (e.g., a reamer, reamer wing, impregnated diamond drill bit, core bit, etc.) as known in the art, without limitation. As shown in FIG. 29, a rotor 416 and a stator 418 (i.e., a thrust bearing apparatus) may be operably assembled to downhole drilling motor assembly 412, as known in the art.

In one embodiment, a bearing apparatus may include polycrystalline diamond inserts or compacts defining a plurality of surfaces that move relative to one another. Such bearing apparatuses may encompass so-called thrust bearings, radial bearings, or other bearing apparatuses including bearing surfaces that move in relation to one another, without limitation. More particularly, the present invention relates to a structure for supporting at least one bearing element including an arcuate bearing surface (e.g., convex, concave, substantially cylindrical, substantially spherical, etc.), wherein a bevel or chamfer is formed about at least a portion of a periphery of the bearing surface.

One aspect of the present invention relates generally to bearing apparatuses including an inner race and an outer race wherein the inner race includes a plurality of bearing elements collectively defining a bearing surface and wherein the outer race includes a plurality of bearing elements collectively defining another bearing surface. Such bearing elements may comprise a superhard material, such as, for example, polycrystalline diamond. According to one aspect of the present invention, a bearing element may include a chamfer or other geometry that removes or diminishes a sharp edge or corner at a periphery of a bearing surface of a bearing element. Such a configuration may provide a relatively robust bearing element for use in a bearing apparatus.

Generally, a bearing element may include a superhard table or region which forms a bearing surface. In one embodiment, such a bearing surface may be arcuate (substantially conical, substantially cylindrical, substantially spherical, concave, convex, etc.). Further, the present invention contemplates that at least one bearing element (of the inner race, outer race, or both the inner race and the outer race) may include a chamfer formed about at least a portion of a periphery of the bearing surface. Such an embodiment may provide a beneficial bearing surface configuration.

Figure 30:
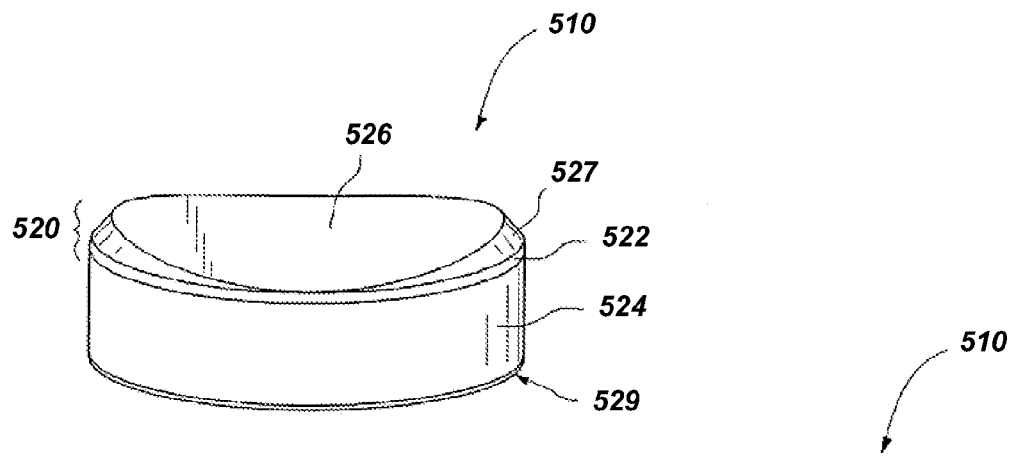
FIG. 30 shows a perspective view of one embodiment of a bearing element according to the present invention.
Figure 31:
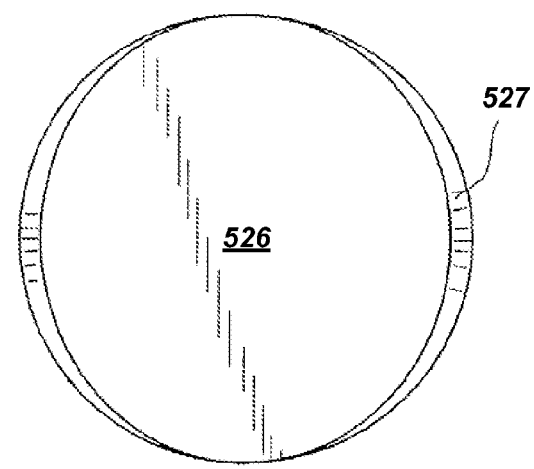
FIG. 31 shows a top elevation view of the bearing element shown in FIG. 30.

For example, in one embodiment, a bearing element may include a concave superhard bearing surface, wherein a chamfer is formed about at least a portion of the periphery of the arcuate, superhard bearing surface. For example, FIG. 30 shows a perspective view of a bearing element 510 including a superhard table 520 (e.g., comprising polycrystalline diamond, cubic boron nitride, silicon carbide, etc.) formed upon a substrate 524. In one particular embodiment, superhard table 520 may comprise polycrystalline diamond. In another embodiment, at least a portion of superhard table 520 may comprise a silicon carbide and diamond composite material as described in U.S. Pat. No. 7,060,641. Optionally, a chamfer 529 may be formed on a lower edge region of the substrate 524. In addition, as shown in FIG. 30, superhard table 520 forms bearing surface 526. As shown in FIG. 30, bearing surface 526 may be concave. In one embodiment, bearing surface 526 may be substantially cylindrical (i.e., forming at least a portion of a substantially cylindrical surface). Bearing surface 526 may be configured for contact with one or more complementary shaped bearing surfaces. The present invention contemplates that a chamfer 527 may be formed adjacent to at least a portion of a periphery of bearing surface 526. Explaining further, chamfer 527 may be formed between bearing surface 526 and side surface 522 of superhard table 520. Particularly, in one embodiment and as shown in FIG. 30, a chamfer 527 may be formed about substantially the entire periphery of bearing surface 526. Explaining further, FIG. 31 shows a top elevation view of bearing element 510 (i.e., toward bearing surface 526). As shown in FIG. 31, chamfer 527 surrounds bearing surface 526. Put another way, chamfer 527 may be substantially continuous about the periphery of bearing surface 526. Such a configuration may inhibit damage to the bearing element 510 in response to contact with a complementary shaped bearing surface.

Figure 32:
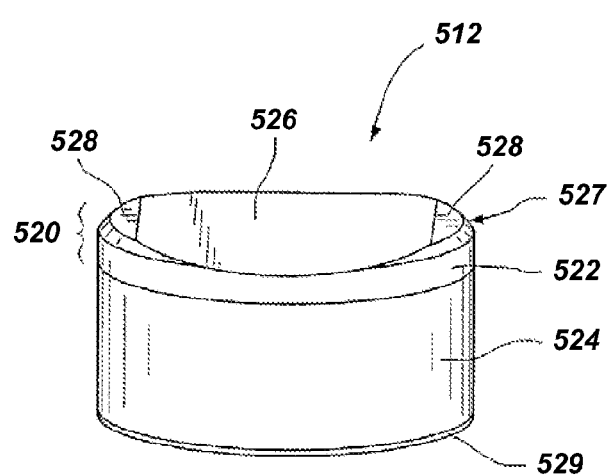
FIG. 32 shows a perspective view of another embodiment of a bearing element according to the present invention.
Figure 33:
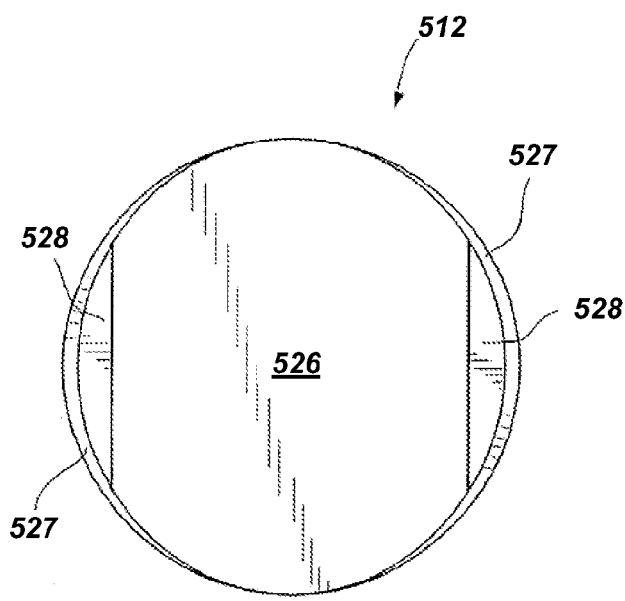
FIG. 33 shows a top elevation view of the bearing element shown in FIG. 32.

Generally, the present invention contemplates that one or more chamfered regions may be formed adjacent (or about) a periphery of a bearing surface of a bearing element. For instance, in another embodiment, a chamfer may be formed about only a selected portion of a periphery of a bearing surface of a bearing element. Particularly, FIG. 32 shows a perspective view of a bearing element 512 generally configured as described above with respect to bearing element 510. Particularly, bearing element 512 may include a superhard table 520 forming a concave bearing surface 526. As shown in FIG. 32, bearing surface 526 may be concave. In one embodiment, bearing surface 526 may comprise a portion of a substantially cylindrical surface. Further, chamfer 527 may be formed about at least a portion of a periphery of bearing surface 526. In further detail, FIG. 33 shows a top elevation view of bearing element 512, wherein two separate chamfers 527 (or chamfered regions) are formed about selected portions of the periphery of bearing surface 526. Thus, as shown in FIG. 33, chamfers 527 may be only formed about a selected portion of a periphery of bearing surface 526. Chamfers 527 may be substantially identical, substantially symmetric, or may differ from one another, without limitation. Optionally, substantially planar surfaces 528 may be formed by superhard table 520. Also, substrate 524 may optionally include a chamfer 529, as shown at FIG. 32.

As discussed above, a bearing element may include an arcuate bearing surface configured for contact with a complementary shaped arcuate bearing surface. As one of ordinary skill in the art will appreciate, in one example, bearing elements each including a concave bearing surface and bearing elements each including a convex bearing surface may be configured for contacting one another. As one of ordinary skill in the art will appreciate, a generally concave bearing surface of one or more bearing elements may be configured for contact with a generally convex bearing surface of one or more different bearing elements. Embodiments of bearing elements including a concave bearing surface are discussed hereinabove.

Figure 34:
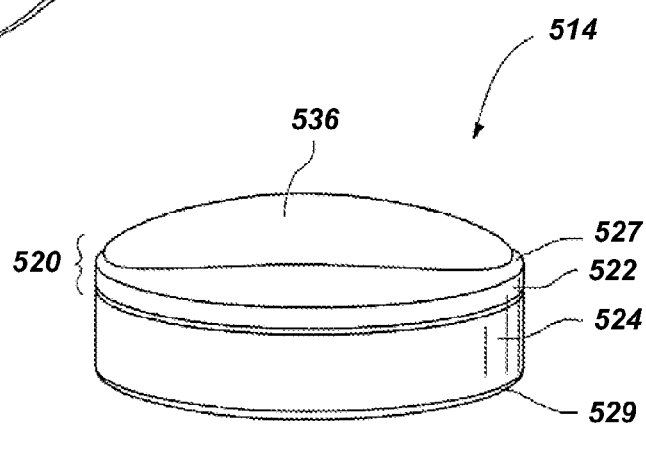
FIG. 34 shows a perspective view of a further embodiment of a bearing element according to the present invention.
Figure 35:
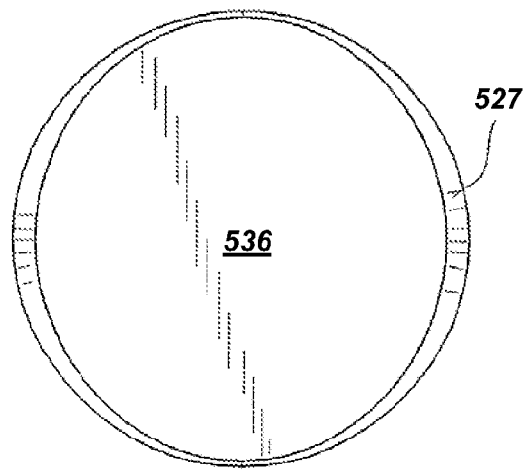
FIG. 35 shows a top elevation view of the bearing element shown in FIG. 34.
Figure 36:
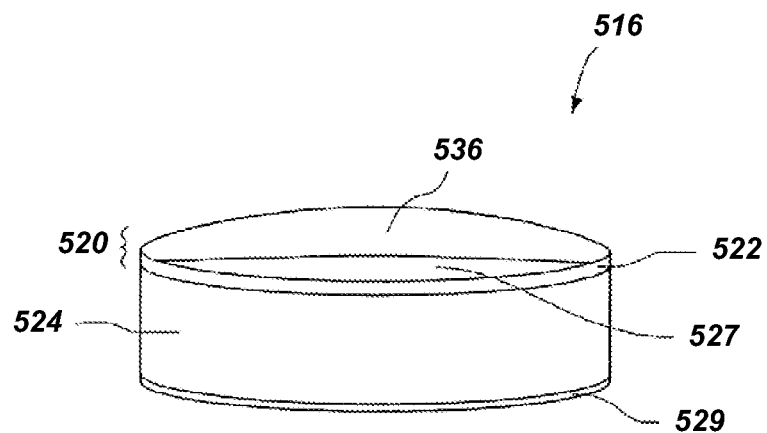
FIG. 36 shows a perspective view of yet an additional embodiment of a bearing element according to the present invention.
Figure 37:
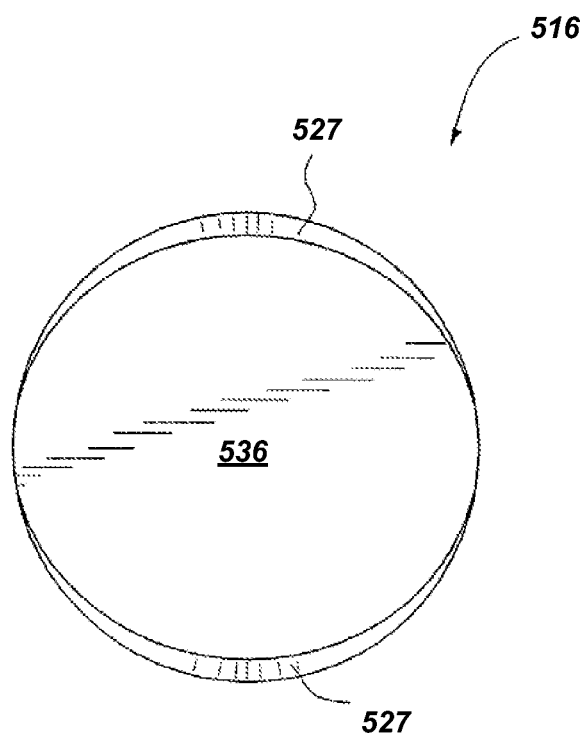
FIG. 37 shows a top elevation view of the bearing element shown in FIG. 36.

Relative to a bearing element including a convex bearing surface, for example, FIG. 34 shows a perspective view of one embodiment of a bearing element 514 including a superhard table 520 (e.g., comprising polycrystalline diamond, cubic boron nitride, silicon carbide, etc.) formed upon a substrate 524, wherein the superhard table 520 forms a convex bearing surface 536. In one embodiment, convex bearing surface 536 may be substantially cylindrical (i.e., may form a portion of a substantially cylindrical surface). Further, the present invention contemplates that a chamfer 527 may be formed adjacent to at least a portion of a periphery of bearing surface 536. Accordingly, chamfer 527 may be formed between bearing surface 536 and side surface 522 of superhard table 520. In one embodiment and as shown in FIG. 34, a chamfer 527 may be formed about substantially the entire periphery of bearing surface 536. FIG. 35 shows a top elevation view of bearing element 514 (i.e., as if viewed toward bearing surface 536). As shown in FIG. 35, chamfer 527 surrounds bearing surface 536. Put another way, chamfer 527 may be substantially continuous about the periphery of bearing surface 536. Such a configuration may inhibit damage to the bearing element 514 in response to contact with a complementary shaped bearing surface In another embodiment, at least one chamfer (or chamfered region) may be formed about only a selected portion of a periphery of a bearing surface of a bearing element. For example, FIG. 36 shows a perspective view of a bearing element 516 generally configured as described above with respect to bearing element 510. Particularly, FIG. 36 shows a perspective view of a bearing element 516 including a superhard table 520 (e.g., comprising polycrystalline diamond, cubic boron nitride, silicon carbide, etc.) formed upon a substrate 524, wherein the superhard table 520 forms a bearing surface 536. As shown in FIG. 36, bearing surface 536 may be convex. In one embodiment, bearing surface 536 may comprise a portion of a substantially cylindrical surface. As shown in FIG. 36, chamfer 527 may be formed about at least a portion of a periphery of bearing surface 536. In further detail, FIG. 37 shows a top elevation view of bearing element 516, wherein two separate chamfers 527 are formed about selected portions of the periphery of bearing surface 536. Chamfers 527 may be substantially identical, substantially symmetric, or may differ from one another, without limitation.

Figure 38:
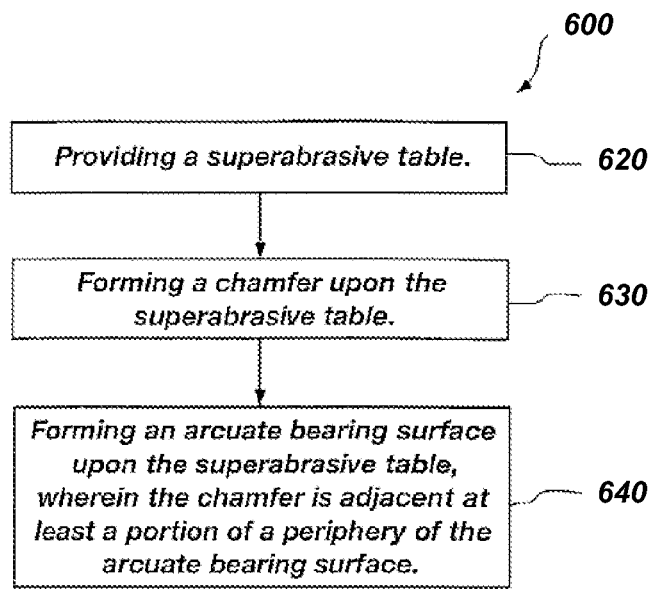
FIG. 38 shows a schematic diagram depicting one embodiment of a method for forming a bearing element according to the present invention.
Figure 39:
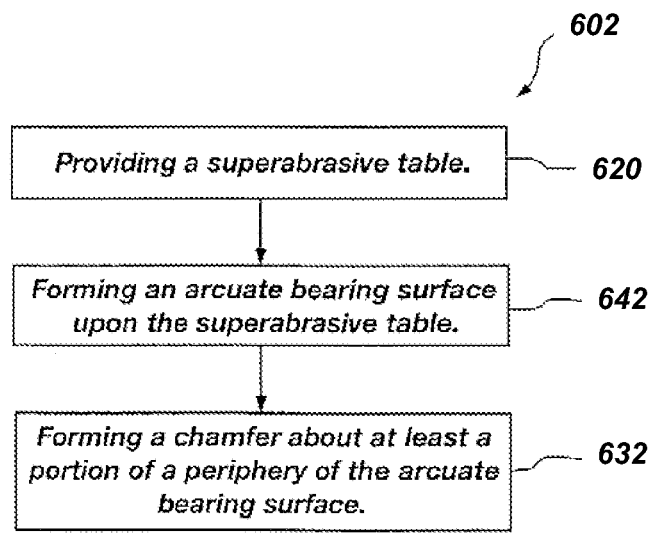
FIG. 39 shows a schematic diagram depicting another embodiment of a method for forming a bearing element according to the present invention.

Another aspect of the present invention relates to methods of forming a bearing element including an arcuate surface. FIGS. 38 and 39 show schematic diagrams of different methods of forming a bearing element including an arcuate surface and a chamfer about at least a portion of a periphery of a bearing surface of the bearing element. FIGS. 40-42B show various features of an exemplary superhard compact (i.e., a superhard table bonded to a substrate) at selected stages of process actions depicted in FIGS. 38 and 39. Thus, FIGS. 38-42B illustrate exemplary details of bearing elements at intermediate stages of manufacture relating to methods according to the present invention.

Figure 40:
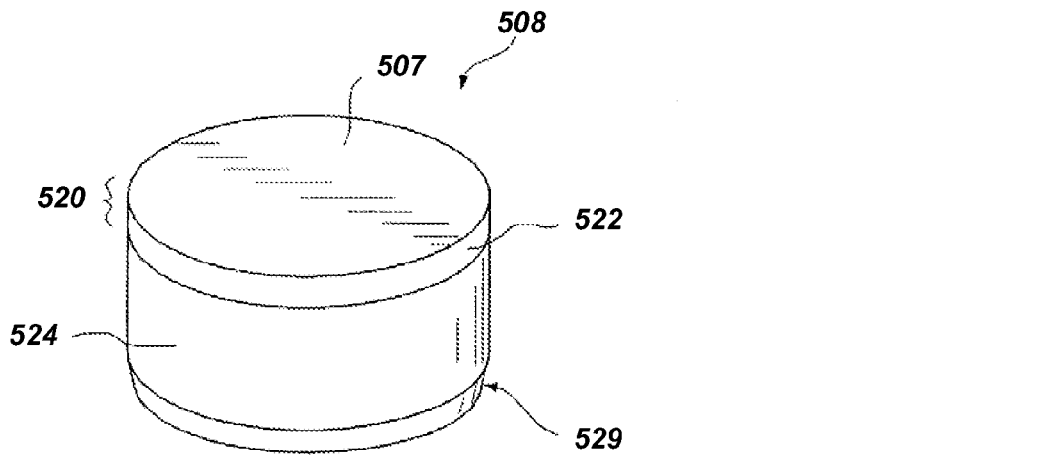
FIG. 40 shows a perspective view of a bearing element according to the present invention at an intermediate stage during manufacturing.

More specifically, FIG. 38 shows a schematic diagram including actions (not necessarily in temporal order) comprising a method 600 for forming a bearing element including an arcuate surface and a chamfer about at least a portion of a periphery of a bearing surface of the bearing element. As shown in FIG. 38 in action 620, a superhard table may be provided. In one embodiment, a superhard compact (i.e., a bearing element) comprising a superhard table bonded to a substrate (e.g., a polycrystalline diamond compact) may be provided. Explaining further, FIG. 40 shows a perspective view of bearing element 508 comprising a superhard table (e.g., polycrystalline diamond, etc.) bonded to a substrate 524 (e.g., cobalt cemented tungsten carbide). As shown in FIG. 40, superhard table 520 includes a substantially planar upper surface 507 and a side surface 522. As mentioned above, superhard table 520 may be formed upon substrate 524 by way of an ultra-high pressure, ultra-high temperature process. Subsequent to sintering superhard table 520, substantially planar upper surface 507 may be formed by lapping, grinding, electro-discharge machining, and/or polishing. Optionally, as shown in FIG. 40, both superhard table 520 and substrate 524 may be substantially cylindrical. Such a configuration may be formed by centerless grinding or any other suitable process. In other embodiments, superhard table 520 and substrate may be oblong, elliptical, elongated, non-cylindrical, or otherwise shaped. As a further optional feature, a chamfer 529 may be formed upon a lower edge of substrate 524.

Figure 41:
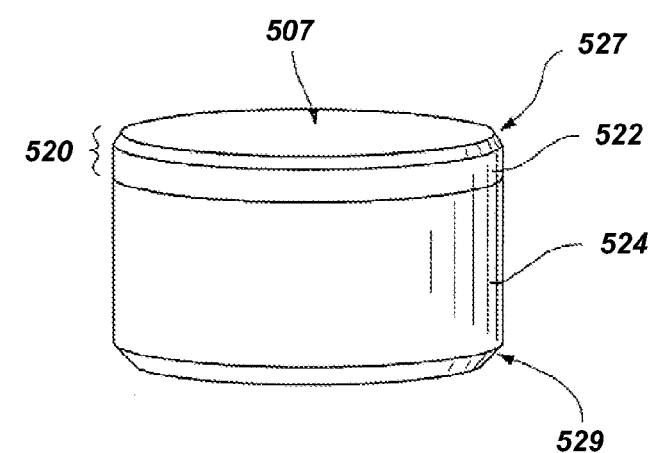
FIG. 41 shows a perspective view of a bearing element according to the present invention at an intermediate stage of manufacturing.
Figure 42A:
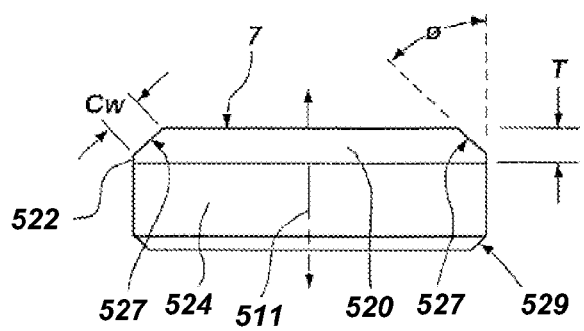
FIG. 42A shows a side cross-sectional view of the bearing element shown in FIG. 41.

Referring now to FIG. 38, method 600 may also include action 630, which comprises forming a chamfer upon the superhard table. Thus, as shown in FIG. 41, a chamfer 527 may be formed between side surface 522 and upper surface 507 of superhard table 520, about a selected portion of a periphery of upper surface 507, without limitation. Chamfer 527 may be formed by grinding, lapping, electro-discharge machining, combinations of the foregoing, or by any suitable method or process, without limitation. Explaining further, FIG. 42A shows a side cross-sectional view of the bearing element 509 (relative to longitudinal axis 511), as shown in FIG. 41. As shown in FIG. 42A, a chamfer 527 may be formed between upper surface 507 and side surface 522 at a selected angle θ. Further, chamfer 527 may exhibit a selected width $C_w$, as shown in FIG. 39. In one embodiment, a thickness T of superhard table 520 may be about 0.075 inches and chamfer 527 may be formed at an angle θ of about 45°, and chamfer 527 may exhibit a width $C_w$ of about 0.040 inches. More generally, in another embodiment, chamfer 527 may be formed at an angle of between 5° and about 85° and may exhibit a width $C_w$ of between about 0.010 inches and about 0.100 inches, without limitation. One of ordinary skill in the art will understand that, in one embodiment, chamfer 527 may be formed in such a configuration that side surface 522 is completely removed from at least a portion of superhard table 520.

Referring now to FIG. 38, method 600 may further include action 640, which comprises forming an arcuate bearing surface upon the superhard table, wherein the chamfer is adjacent at least a portion of the periphery of the arcuate bearing surface. Thus, bearing element 509 (FIGS. 41 and 42A) may be machined or otherwise modified to form a bearing element including an arcuate bearing surface. For example, bearing element 509 (FIGS. 41 and 42A) may be machined or otherwise modified to form a bearing element according to any embodiment shown in FIGS. 30-37. More specifically, by way of example, an arcuate bearing surface may be formed upon superhard table 520 of bearing element 509 by wire electro-discharge machining (wire EDM), plunge electro-discharge machining (plunge EDM), grinding, lapping, combinations of the foregoing, or by any other suitable method or combination of methods, without limitation. As discussed below, in one embodiment, a plurality of bearing elements, at least one including a chamfer may be affixed to a race and then an arcuate bearing surface may be formed upon each of the plurality of bearing elements. Such a configuration may provide ease in manufacturing and may be relatively accurate in terms of machining tolerances.

FIG. 39 shows a schematic diagram of another embodiment of a method 602 for forming a bearing element including an arcuate surface and a chamfer about at least a portion of a periphery of a bearing surface of the bearing element. Action 620 includes providing a superhard table. By way of example, in one embodiment, as shown in FIGS. 41 and 42A, a superhard table 520 may be formed upon a substrate 524. In a further action depicted in FIG. 39, method 602 may also comprise action 642, which comprises forming an arcuate bearing surface upon the superhard table. As discussed above, an arcuate bearing surface may be formed upon superhard table 520 of bearing element 509 by wire electro-discharge machining (wire EDM), plunge electro-discharge machining (plunge EDM), grinding, lapping, combinations of the foregoing, or by any other suitable method or combination of methods, without limitation. For example, bearing element 509 (FIGS. 41 and 42A) may be machined or otherwise processed to form a bearing element according to any embodiment shown in FIGS. 30-37. Further, method 602 may include action 642, which comprises forming a chamfer about at least a portion of the arcuate bearing surface. Geometrical features of a superhard table (e.g., chamfer, arcuate bearing surface, etc.) may be formed by grinding, lapping, electro-discharge machining, combinations of the foregoing, features formed upon sintering of the superhard material, or by any suitable method or process, without limitation.

Thus, summarizing, one of ordinary skill in the art will appreciate that a chamfer may be formed, by way of example only, prior to forming an arcuate bearing surface, subsequent to forming an arcuate bearing surface, or intermittently or contemporaneously with forming an arcuate bearing surface, without limitation. One of ordinary skill in the art will also appreciate that if a substantially planar upper surface is formed upon a superhard table, subsequent formation of an arcuate surface upon the superhard table may completely remove the substantially planar surface or a portion of the substantially planar surface may remain. Further, forming a chamfer and/or an arcuate bearing surface may occur subsequent to mounting or affixing a bearing element to a race, as described hereinbelow. Such variations are contemplated by the present invention, without limitation.

Figure 42B:
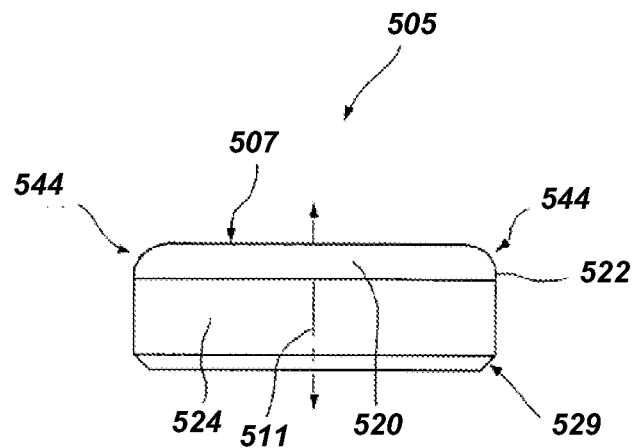
FIG. 42B shows a side cross-sectional view of a bearing element including a radius formed about at least a portion of a periphery of a bearing surface.

Furthermore, the present invention contemplates that forming other geometries about a periphery of an arcuate bearing surface may be advantageous. For example, a radius extending between a side surface of a diamond table about at least a portion of an arcuate bearing surface may provide clearance and inhibit damage to the bearing element. For example, FIG. 42B shows a schematic, side cross-sectional view of a bearing element 505 including a radius 544 extending between upper surface 507 and side surface 522. Radius 544 may exhibit a selected size and position, without limitation. Of course, multiple chamfers, tapers, rounded features, radiuses, or combinations or the foregoing may be employed to at least partially remove an otherwise "sharp" corner or intersection between a side surface of a diamond table and an arcuate surface of a bearing element, without limitation.

Figure 43:
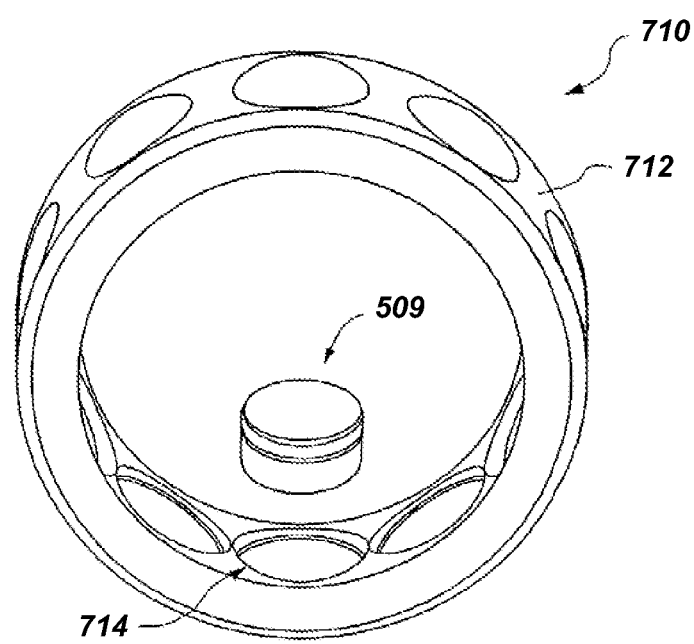
FIG. 43 shows a partial, exploded perspective view of an outer race and a bearing element at an intermediate stage of manufacture.

A further aspect of the present invention relates to bearing apparatuses including at least one bearing element according to the present invention. For example, FIG. 43 shows a perspective view of an outer race 710 comprising body 712, which defines a plurality of recesses 714 each configured for accepting a bearing element (e.g., shown as bearing element 509, as described hereinabove with respect to FIGS. 41 and 42A) positioned generally therein. For example, a plurality of bearing elements 509 may be adhesively bonded, brazed, welded, fastened, mechanically affixed, or otherwise affixed to the body 712 of outer race 710 by any suitable method. As shown in FIG. 43, body 712 of outer race 710 may be configured in a generally ring-shaped (e.g., substantially cylindrical ring, substantially conical ring, etc.) configuration and may define an aperture within which an inner race may be positioned. In further detail, subsequent to affixing a plurality of bearing elements 509 within recesses 714, respectively, arcuate bearing surfaces may be formed upon each superhard table of each bearing element 509. For example, each bearing element may be affixed to body 712 of outer race 710 within a respective recess 714 and then a machining process may be performed upon bearing elements 509 to form an arcuate bearing surface on each of bearing elements 509. Generally, as discussed above, an arcuate bearing surface may be formed by grinding, lapping, electro-discharge machining, combinations of the foregoing, features formed upon sintering of the superhard material, or by any suitable method or process, without limitation. In one embodiment, a wire electro-discharge machining operation may be performed by traversing a wire along a substantially cylindrical path within the outer race to form a respective portion of a substantially cylindrical surface upon each bearing surface of each bearing element 509. One of ordinary skill in the art will understand that it may be, for ease of manufacturing and for improved tolerances, beneficial to form an arcuate bearing surface upon each of bearing elements 509 after affixation to the outer race 710. Further, it may be beneficial to form a concave (e.g., substantially cylindrical) bearing surface upon each of bearing elements 509. In other embodiments, depending on the orientation and configuration of the plurality of bearing elements, a bearing surface of each bearing element affixed to the outer race 710 may be concave, convex, or otherwise configured, without limitation.

Figure 44:
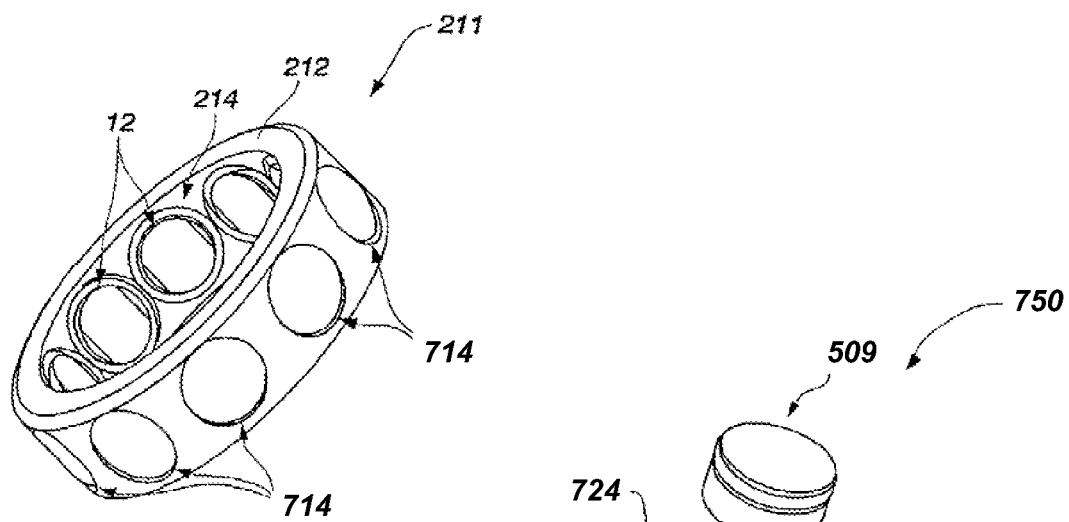
FIG. 44 shows a perspective view of an outer race including a plurality of bearing elements according to the present invention coupled to the outer race.

One of ordinary skill in the art will also understand that an arcuate bearing surface may be formed on at least one bearing element prior to affixation to body 712 of outer race 710. Such a configuration may provide certain advantages in manufacturing flow and ease. FIG. 44 shows a perspective view of outer race 710 including a plurality of, for example, bearing elements 512 each including a concave bearing surface, each bearing element respectively positioned within recesses 714. In another embodiment, bearing elements 510 (FIGS. 30 and 31) may be employed. As discussed above, bearing elements 512 may be formed prior to affixation to body 712 or may be formed after, for example, bearing elements 509 are affixed to body 712 of outer race 710, without limitation. One of ordinary skill in the art will understand that recesses 714 and bearing elements 512 may be configured (e.g., sized, spaced, etc.) to provide bearing surfaces configured for interaction with complementary shaped bearing surfaces of a plurality of bearing elements affixed to an inner race.

Figure 45:
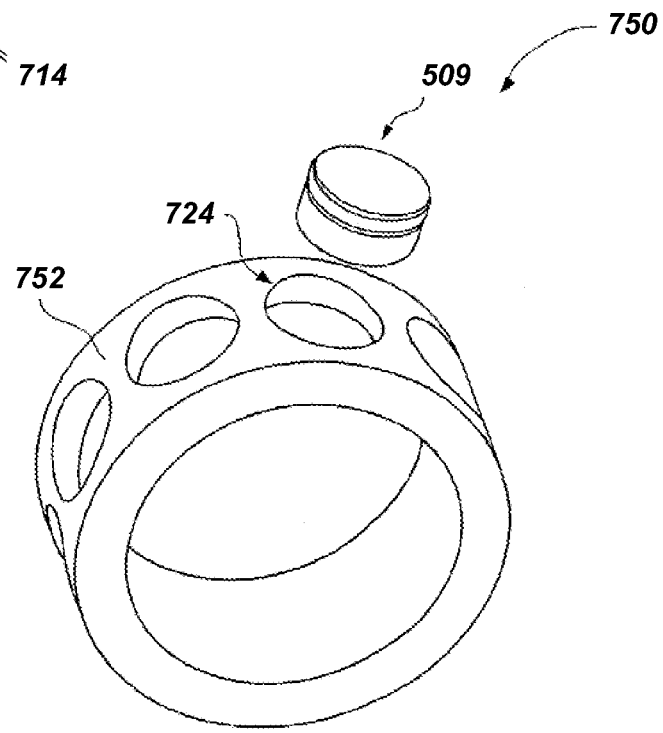
FIG. 45 shows a partial, exploded perspective view of an inner race and a bearing element at an intermediate stage of manufacture.

For example, FIG. 45 shows a partial exploded assembly view of inner race 750 including one bearing element 509 generally aligned with recess 724. Each of recesses 724 may be configured to retain a bearing element 509 positioned therein. For example, bearing element 509 may be adhesively bonded, brazed, welded, fastened, mechanically affixed, or otherwise affixed to the body 752 of inner race 750 generally within a recess 724. Recesses 724 may be circumferentially spaced about the outer diameter of inner race 750. Thus, summarizing, a plurality of bearing elements 509 may be coupled to the body 752 of inner race 750 so that each bearing surface of the bearing elements 509 form a collective bearing surface for a radial bearing apparatus. In one embodiment, such a collective bearing surface may be substantially cylindrical or substantially conical. As discussed above, an arcuate bearing surface may be formed upon each of bearing elements 509 after affixation to the inner race 750. An arcuate bearing surface may be formed by grinding, lapping, electro-discharge machining, combinations of the foregoing, features formed upon sintering of the superhard material, or by any suitable method or process, without limitation. In one embodiment, a wire electro-discharge machining operation may be performed by traversing a wire along a substantially cylindrical path about the inner race to form a respective portion of a substantially cylindrical surface upon each bearing surface of each bearing element 509.

One of ordinary skill in the art will also understand that an arcuate bearing surface may be formed on at least one bearing element prior to affixation to body 752 of inner race 750, if desired. Further, it may be beneficial to form a convex (e.g., substantially cylindrical) bearing surface upon each of bearing elements 509 affixed to inner race 750. In other embodiments, depending on the orientation and configuration of the plurality of bearing elements, a bearing surface may be concave, convex, or otherwise configured, without limitation.

Figure 46:
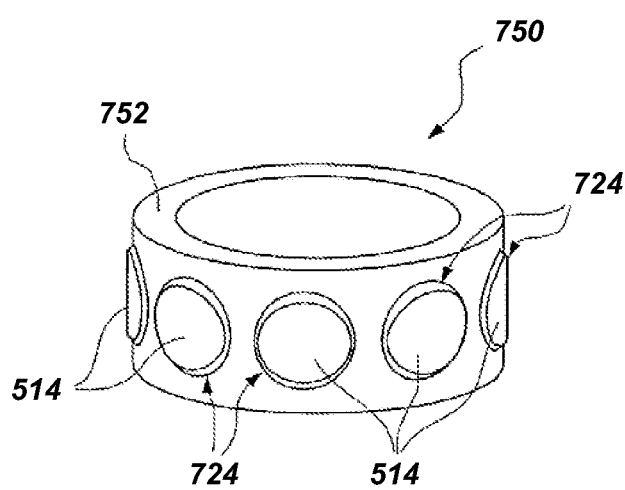
FIG. 46 shows a perspective view of an inner race including a plurality of bearing elements according to the present invention coupled to the inner race.

FIG. 46 shows a perspective view of inner race 750 including a plurality of, for example, bearing elements 514 each including a convex bearing surface, each bearing element 514 respectively positioned within recesses 724. In another embodiment, bearing elements 516 (FIGS. 36 and 37) may be employed. As discussed above, bearing elements 514 may be formed prior to affixation to body 752 or may be formed from bearing elements 509 affixed to body 752 of inner race 750, without limitation. One of ordinary skill in the art will understand that recesses 724 and bearing elements 514 may be configured (e.g., sized, spaced, etc.) to provide bearing surfaces configured for interaction with complementary shaped bearing surfaces of a plurality of bearing elements affixed to an outer race.

Figure 47:
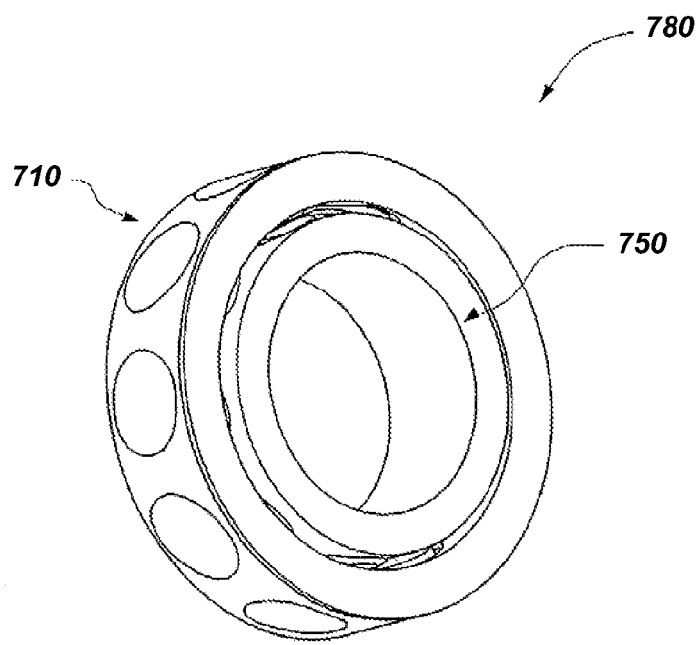
FIG. 47 shows a perspective view of a radial bearing assembly according to the present invention.

Accordingly, the present invention contemplates that an inner race may be positioned within the outer race and may include a bearing surface defined by a plurality of bearing elements, wherein each of the bearing elements has its own bearing surface. For example, FIG. 47 shows a perspective view of a radial bearing apparatus 780 including inner race 750 positioned generally within outer race 710. Outer race 710 includes a plurality of bearing elements affixed thereto and an inner race 750 includes a plurality of bearing elements affixed thereto, wherein the inner race 750 is positioned generally within the outer race 710. Thus, inner race 750 and outer race 710 may be configured so that the bearing surfaces (collectively defined by the respective plurality of bearing elements affixed to the inner race 750 and the respective plurality of bearing elements affixed to the outer race 710) may at least partially contact one another.

The present invention contemplates that although the bearing apparatus discussed above includes a plurality of bearing elements each including a chamfer, the present invention is not so limited. Rather, the present invention contemplates that an inner race and an outer race may be assembled to form a bearing apparatus wherein at least one bearing element of either the inner race or the outer race includes a chamfer formed about at least a portion of a periphery of its arcuate bearing surface.

Figure 48:
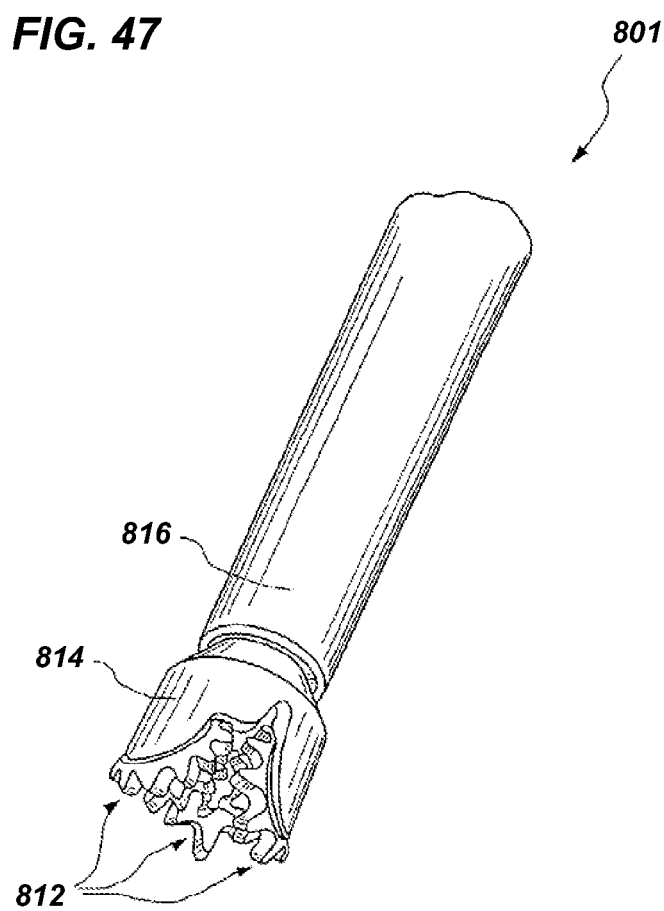
FIG. 48 shows a perspective view of a subterranean drilling system including a bearing apparatus according to the present invention.

Of course, such a radial bearing apparatus may be included within a mechanical system. For instance, so-called "roller cone" rotary drill bits may benefit from a radial bearing apparatus contemplated by the present invention. More specifically, it may be appreciated that an inner race may be mounted or affixed to a spindle of a roller cone and an outer race may be affixed to an inner bore formed within a cone and that such an outer race and inner race may be assembled to form a radial bearing apparatus. Such a radial bearing apparatus may be advantageous because of its ability to withstand relatively high temperatures and its wear resistance. For example, the present invention contemplates that a roller cone rotary drill bit as disclosed in U.S. Pat. No. 4,738,322 to Hall, et al., the disclosure of which is incorporated herein, in its entirety, by this reference may include at least one superhard bearing element or a radial bearing apparatus encompassed by the present invention. For example, FIG. 48 shows a perspective view of a subterranean drilling system 801 incorporating a radial bearing apparatus according to the present invention. More specifically, rotary drill bit 814 is shown as a so-called "roller cone" type bit including roller cones 812. Further, roller cones 812 may comprise a radial bearing assembly according to the present invention wherein an inner race is positioned adjacent to a spindle and an outer race is positioned adjacent to a surface of a roller cone 812.

As mentioned above, the bearing apparatuses disclosed above may be incorporated into any suitable mechanical system. Any other suitable rotary drill bit or drilling tool may include a radial bearing apparatus according to the present invention, without limitation.

Further, in another example, a radial bearing according to the present invention may be included within a motor or turbine. For example, the present invention contemplates that a roller cone rotary drill bit as disclosed in U.S. Pat. Nos. 4,764,036, 4,410,054, and 4,560,014, the disclosure of each of which is incorporated herein, in its entirety, by this reference may include at least one superhard bearing element or a radial bearing apparatus encompassed by the present invention. Generally, such a downhole drilling motor assembly may be located at the end of a series of pipe sections comprising a drill string. The housing of downhole drilling motor assembly may remain stationary as a rotary drill bit coupled thereto rotates. Thus, an output shaft of a downhole drilling motor assembly may be coupled to a rotary drill bit and drilling fluid (i.e., drilling mud) may cause torque to be applied to the output shaft to cause a rotary drill bit to rotate. Thus, such a downhole drilling motor or turbine assembly may include one or more radial bearing apparatuses. Although the apparatuses and systems described above have been discussed in the context of subterranean drilling equipment and applications, it should be understood that such apparatuses and systems are not limited to such use and could be used within a bearing apparatus or system for varied applications, if desired, without limitation. Thus, such apparatuses and systems are not limited to use with subterranean drilling systems and may be used with various other mechanical systems, without limitation.

While certain embodiments and details have been included herein for purposes of illustrating aspects of the instant disclosure, it will be apparent to those skilled in the art that various changes in the systems, apparatuses, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A bearing apparatus comprising:
   a first body having a first plurality of recesses formed therein;
   a first plurality of bearing elements, each bearing element having an individual bearing surface, wherein the first plurality of individual bearing surfaces define a first collective bearing surface, wherein each of the first plurality of bearing elements is at least partially disposed within an associated one of the first plurality of recesses, and wherein at least one bearing element of the first plurality of bearing elements includes a superhard table and a chamfer extending only partially around the individual bearing surface; and
   at least one compliant member associated with the at least one bearing element, the at least one compliant member being configured to enable displacement of the at least one bearing element relative to the first body in at least one direction, wherein the individual bearing surface of the at least one bearing element of the first plurality of bearing elements includes an arcuate bearing surface.

2. The bearing apparatus of claim 1, wherein the at least one compliant member includes a first plurality of compliant members, each of the first plurality of compliant members being at least partially disposed in an associated one of the first plurality of recesses and configured to enable displacement of an associated one of the first plurality of bearing elements relative to the first body.

3. The bearing apparatus of claim 1, wherein the at least one compliant member comprises a biasing element.

4. The bearing apparatus of claim 3, wherein the biasing element includes a wave spring washer, a curved spring washer, or a Belleville spring washer.

5. The bearing apparatus of claim 1, wherein the at least one chamfer exhibits a variation in width as it extends along a periphery of the arcuate bearing surface.

6. The bearing apparatus of claim 1, wherein each of the individual bearing surfaces of the first plurality of bearing elements includes an arcuate bearing surface.

7. The bearing apparatus of claim 6, wherein each arcuate bearing surface includes a concave surface.

8. The bearing apparatus of claim 6, wherein each arcuate bearing surface includes a convex surface.

9. The bearing apparatus of claim 1, wherein the superhard table comprises a polycrystalline diamond table and wherein the polycrystalline diamond table is bonded to a substrate.

10. The bearing apparatus of claim 1, further comprising:
    a second body having a second plurality of recesses formed therein;
    a second plurality of bearing elements, each bearing element of the second plurality having an individual bearing surface, wherein the plurality of individual bearing surfaces of the second plurality of bearing elements define a second collective bearing surface configured for direct contact with the first collective bearing surface, wherein each of the second plurality of bearing elements is at least partially disposed within an associated one of the plurality of recesses of the second body, and wherein at least one bearing element of the second plurality of bearing elements includes a superhard table and a chamfer formed in the superhard table extending at least partially around the individual bearing surface.

11. The bearing apparatus of claim 10, wherein the first body is substantially ring-shaped.

12. The bearing apparatus of claim 11, wherein the second body is substantially ring-shaped.

13. The bearing apparatus of claim 10, wherein the individual bearing surface of the at least one bearing element of the second plurality of bearing elements includes an arcuate bearing surface.

14. The bearing apparatus of claim 10, further comprising at least one additional compliant member associated with the at least one bearing element of the second plurality of bearing elements, the at least one additional compliant member being configured to enable displacement of the at least one additional bearing element of the second plurality of bearing elements relative to the second body in at least one direction responsive to contact of the at least one bearing element of the second plurality of bearing elements with the first collective bearing surface.

* * * * *